(12) United States Patent
Iriyama et al.

(10) Patent No.: US 6,175,451 B1
(45) Date of Patent: Jan. 16, 2001

(54) OPTICAL AXIS CORRECTING APPARATUS AND METHOD OF CORRECTING OPTICAL AXIS

(75) Inventors: Toshihisa Iriyama; Yujiro Ito, both of Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 09/354,969

(22) Filed: Jul. 16, 1999

(30) Foreign Application Priority Data

Jul. 30, 1998 (JP) .................................................. 10-215798

(51) Int. Cl.[7] ........................... G02B 27/10; G02B 27/14; G02B 7/02; H04B 10/00
(52) U.S. Cl. ......................... 359/627; 359/629; 359/823; 359/159; 359/172
(58) Field of Search ................................... 359/618, 627, 359/629, 822, 823, 159, 172

(56) References Cited

U.S. PATENT DOCUMENTS

| | | | |
|---|---|---|---|
| 5,065,455 | * 11/1991 | Ito et al. ................................ | 359/159 |
| 5,627,669 | * 5/1997 | Orino et al. ........................... | 359/156 |
| 5,689,354 | * 11/1997 | Orino .................................... | 359/172 |
| 5,978,121 | * 11/1999 | Fischer et al. ........................ | 359/156 |
| 6,086,209 | * 7/2000 | Miyahara et al. .................... | 359/872 |

* cited by examiner

Primary Examiner—Georgia Epps
Assistant Examiner—Saeed Seyrafi
(74) Attorney, Agent, or Firm—Limbach & Limbach L.L.P.

(57) ABSTRACT

An optical axis correcting apparatus for correcting the optical axes of light beams from a communicating party in an optical space transmission system that transmits and receives the light beams to/from the communicating party, comprises, in order to further accurately correct an optical axis with a simple configuration, optical axis changing means for changing the angle of a reflecting mirror placed in the optical path of the light beam and for changing the optical axis of the light beam to be reflected by the reflecting mirror, optical axis direction detecting means for detecting the direction of the optical axis of the light beam that is changed by the optical axis changing means, optical axis adjusting means for adjusting the angle of the reflecting mirror based on the direction of optical axis of the light beam detected by the optical axis direction detecting means through the optical axis changing means in order to adjust the direction of the optical axis of the light beam toward the communicating party, and correction means for detecting a change of angle occurred in the reflecting mirror owing an oscillation applied to the reflecting mirror and for correcting the angle of the reflecting mirror based on the detected result.

6 Claims, 13 Drawing Sheets

OPTICAL AXIS CORRECTING APPARATUS AND METHOD OF CORRECTING OPTICAL AXIS

BACKGROUND OF THE INVENTION

1. Field of the Invention

This invention relates to an optical axis correcting apparatus and a method of correcting an optical axis, and more particularly, is suitably applied to an optical axis correcting apparatus of an optical space transmission system that spatially transmits light beams.

2. Description of the Related Art

A transmission system transmits data from the transmitting side to the receiving side through a cable circuit or by radio. A construction to transmit data from transmitting side to receiving side through a cable circuit has ways in which the cable circuit is provided virtually and underground. However, both methods require troublesome procedure and large-scale construction. On the other hand, to transmit data from the transmitting side to the receiving side by radio, a prescribed frequency band must be allocated out of a limited electric wave source, and realizing it is difficult because practically there is limitation in the number of circuits.

Then, in recent years, an optical space transmission system that transmits various data in optical space with an optical circuit using light beams has been developed. However, an optical space transmission system having sufficient performance to transmit data to a long distance without error has not been developed yet.

For example, as shown in FIG. 1, the optical system 100 of an optical space transmission system capable of the bi-directional communication converts a laser beam from a semiconductor laser 101 that has been modulated in intensity based on a transmission signal into a parallel beam with a lens 102, and makes the parallel beam be incident into a beam splitter 103. The beam splitter 103 reflects the parallel beam and makes it be incident on a concave lens 104 to magnify the parallel beam. Then, the magnified beam is converted into a parallel beam again through a convex lens 105 and is emitted as an emitted light $L_{out}$.

Furthermore, the optical system 100 brings an incident light $L_{in}$ which is transmitted from the communicating party of an optical space transmission system into convergence on the concave lens 104 with the convex lens 105. The converged light is converted into a parallel beam by the concave lens 104, and then the parallel beam is incident into a beam splitter 106 through the beam splitter 103. The beam splitter 106 reflects the parallel beam and brings it into convergence on the light receiving surface of a position detecting sensor 108 through a lens 107. At the same time, the beam splitter 106 makes the parallel beam pass through the sensor 108 and brings it into convergence on the light receiving surface of a light receiving device 110 through a lens 109.

In such an optical system 100, the optical axes must be identical with each other between that system and the optical system of the optical space transmission system of the communicating party. However, deviation unfortunately occurs between their optical axes because the optical system receives influences such as external causes, such as fog, rain, etc., an oscillation occurred inside the system, the change of a temperature of a setting place, or the like. In this case, in the optical space transmission system, even a slight deviation of optical axis causes an error in optical space transmission to a long distance, and it obstructs the communication.

To correct such the deviation of the optical axis, various optical axis correcting apparatuses have been provided. For example, as shown in FIG. 2, in an optical axis correcting apparatus 120, the aforementioned optical system 100 is integrally provided in a body tube 121. The above body tube 121 is supported by an intermediate ring 122 with two bearings for X-axis 123 so as to freely rotate on the X-axis in a rotary-direction.

A motor for X-axis 124 is fixed to the intermediate ring 122. The above motor for X-axis 124 transmits its rotary driving power via a driving gear 125 to a driven gear 126 that is integrated with the bearing for X-axis 123. This makes the body tube 121 rotate on X-axis in the rotary-direction.

Furthermore, the intermediate ring 122 is supported by a pedestal 127 with a bearing for Y-axis 128 so as to freely rotate on Y-axis in the rotary-direction. A motor for Y-axis 129 is fixed to the pedestal 127. The motor for Y-axis 129 transmits its rotary driving power via a driving gear 130 to a driven gear 131 which is integrated with the bearing for Y-axis 128. This makes the intermediate ring 122 and the body tube 121 integrally rotate on Y-axis in the rotary-direction.

The motor for X-axis 124 and the motor for Y-axis 129 make the body tube 121 rotate by a prescribed amount based on the detected result of the position detecting sensor 108 (FIG. 1) with a control part (not shown in figure) such that the optical axis of the emitted beam $L_{out}$ in transmission and the optical axis of the incident beam $L_{in}$ in reception are identical with each other.

On the other hand, as shown in FIG. 3 in which the same reference numerals are applied to corresponding parts of FIG. 1, the optical axis correcting apparatus 140 is composed of a mirror for X-axis 141 provided on the optical path of the optical system 100, a motor for X-axis 142 which makes the mirror for X-axis 141 rotate on X-axis in the rotary-direction, a mirror for Y-axis 143 provided at a position opposite to the mirror for X-axis 141, and a motor for Y-axis 144 which makes the mirror for Y-axis 143 rotate on Y-axis in the rotary-direction.

In this case, the optical axis correcting apparatus 140 makes each of the motor for X-axis 142 and the motor for Y-axis 144 rotate by the prescribed amount based on the detected result of the position detecting sensor 108 with the control part (not shown). This adjusts the rotary angles of the mirror for X-axis 141 and the mirror for Y-axis 143 such that the optical axis of the emitted beam $L_{out}$ in transmission and the optical axis of the incident beam $L_{in}$ in reception are identical with each other.

In the-mentioned optical axis correcting apparatus 120 (FIG. 2), since the optical axes are corrected by moving the whole body tube 121, there is a problem that a response to a command to correct an optical axis deteriorates by the inertia mass of the whole body tube 121.

Furthermore, the optical axis correcting apparatus 120 has problems that accurate bearings and motors for generating large driving power are needed and that the optical axis cannot be accurately corrected because of various influence of its transmission mechanism owing to the motor for transmit rotary power and backlash of gears.

Also the optical axis correcting apparatus 140 (FIG. 3) requires a mirror and a motor for each of X-axis direction and Y-axis direction. This causes problems that its configuration is complicated and enlarged and that the optical axis cannot be accurately corrected owing to backlash in its transmission mechanism.

Furthermore, in the optical axis correcting apparatus 120 and the optical axis correcting apparatus 140, in the case where the rotary angles of the body tube 121, the mirror for X-axis 141 and the mirror for Y-axis 143 are controlled only by their positional information (i.e., angles), the body tube 121, the mirror for X-axis 141 and the mirror for Y-axis 143 unfortunately move from the stop positions when given some large oscillation from outside. Thus, stable control cannot be performed.

The optical axis correcting apparatus 120 and optical axis correcting apparatus 140 are provided with speed sensors which respectively detect an angular velocity component having a high frequency of the time when oscillation leads to movements of the body tube 121, the mirror for X-axis 141 and the mirror for Y-axis 143. The angular velocity component which represents the actual movement detected by the speed sensor is fed back to restrain the movement owing to the oscillation component. Thus, the body tube 121, the mirror for X-axis 141 and the mirror for Y-axis 143 can be controlled stably. However, in the case where the speed sensors are provided individually in the optical axis correcting apparatuses 120 and the optical axis correcting apparatus 140, there is a problem that their configurations are complicated and the whole apparatuses are enlarged.

SUMMARY OF THE INVENTION

In view of the foregoing, an object of this invention is to provide an optical axis correcting apparatus and a method of correcting and optical axis that can further accurately correct and optical axis with a simple configuration.

The foregoing object and other objects of the invention have been achieved by the provision of an optical axis correcting apparatus and a method of correcting an optical axis. The optical axis correcting apparatus for correcting the optical axes of a light beam from a communicating party in an optical space transmission system that transmits and receives the light beam to/from the communicating party, comprises an optical axis changing means for changing the angle of a reflecting mirror placed in the optical path of the light beam to change the optical axis of the light beam to be reflected by the reflecting mirror, an optical axis direction detecting means for detecting the direction of the optical axis of the light beam that is changed by the optical axis changing means, an optical axis adjusting means for adjusting the angle of the reflecting mirror based on the direction of the optical axis of the light beam detected by the optical axis direction detecting means through the optical axis changing means in order to adjust the direction of the optical axis of the light beam toward the communicating party, and a correction means for detecting a change of angle occurred in the reflecting mirror from oscillation applied to the reflecting mirror and for correcting the angle of the reflecting mirror based on the detected result.

Thereby, the angle of the reflecting mirror is adjusted based on the direction of the optical axis of the detected light beam. And at the same time, when an oscillation component from outside leads to rotation of the reflecting mirror, the change of angle is detected and the angle of the reflecting mirror is corrected based on the detected result. Thus, the useless motion of the reflecting mirror owing to the oscillation component is corrected and the optical axis can be accurately corrected.

Furthermore, in a method of correcting an optical axis for correcting the optical axis of a light beam from the communicating party in an optical space transmission system that transmits and receives the light beam to/from the communicating party, the optical axis direction of the light beam that changes by changing the angle of a reflecting mirror placed in the optical path of the light beam is detected, the angle of the reflecting mirror is adjusted based on the optical axis direction of the detected light beam to adjust the optical axis direction of the light beam toward the communicating party, and the change of an angle occurred in the reflecting mirror owing to oscillation applied to the reflecting mirror is detected, and then the angle of the reflecting mirror is corrected based on the detected result.

Thereby, the angle of the reflecting mirror is adjusted based on the optical axis direction of the detected light beam. And at the same time, when an oscillation component from outside leads to rotation of the reflecting mirror, the change of angle is detected and the angle of the reflecting mirror is corrected based on the detected result. Thus, the useless motion of the reflecting mirror owing to the oscillation component is corrected, and the optical axis can be accurately corrected.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) General Configuration of Optical Space Transmission System

Figure 1:
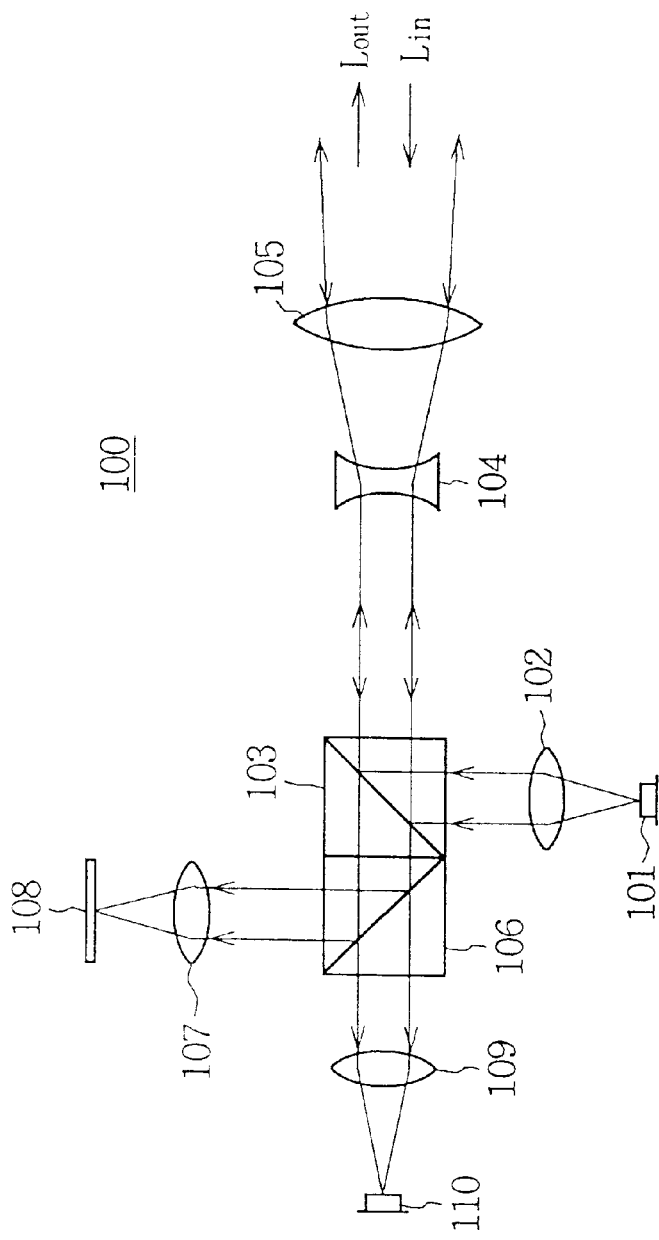
FIG. 1 is a block diagram showing the configuration of an optical system in a conventional optical space transmission system.
Figure 2:
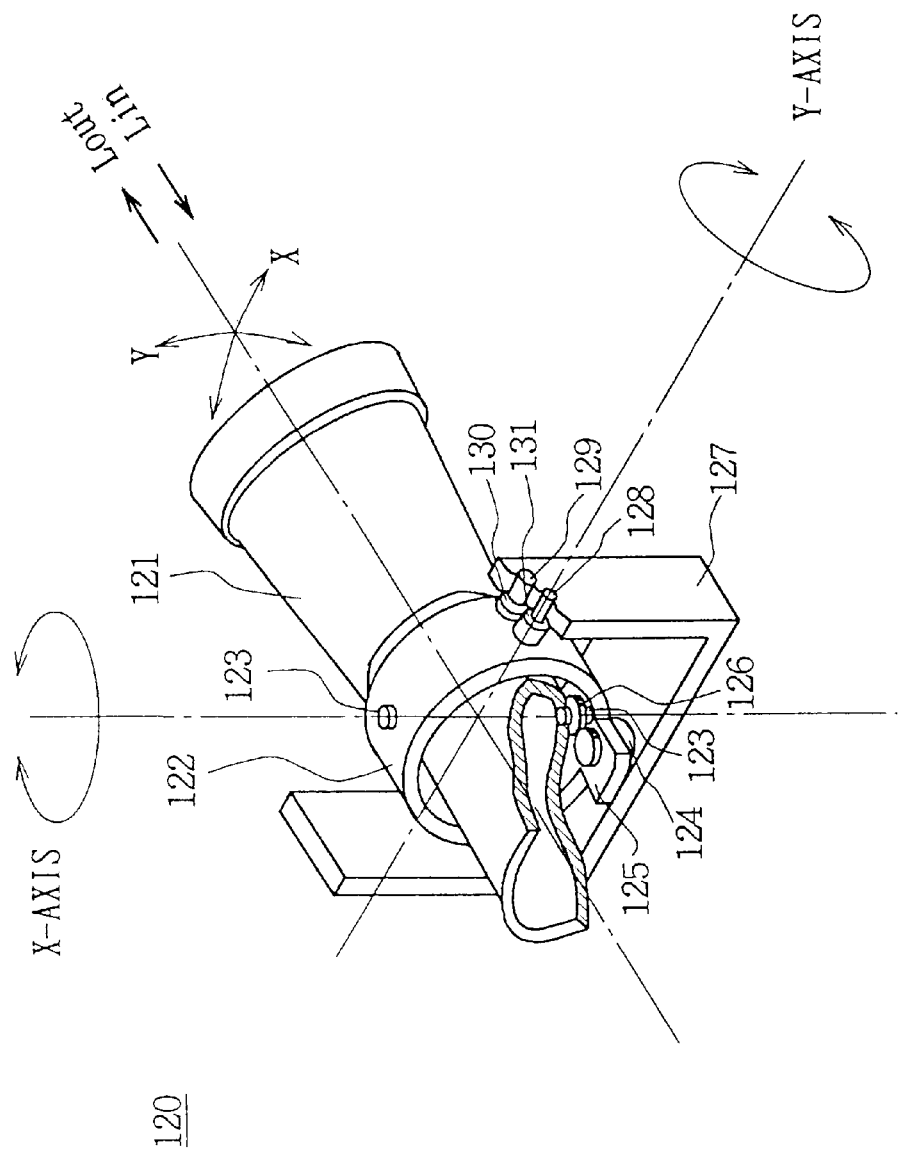
FIG. 2 is a schematic perspective view illustrating the configuration of a conventional optical axis correcting apparatus.
Figure 3:
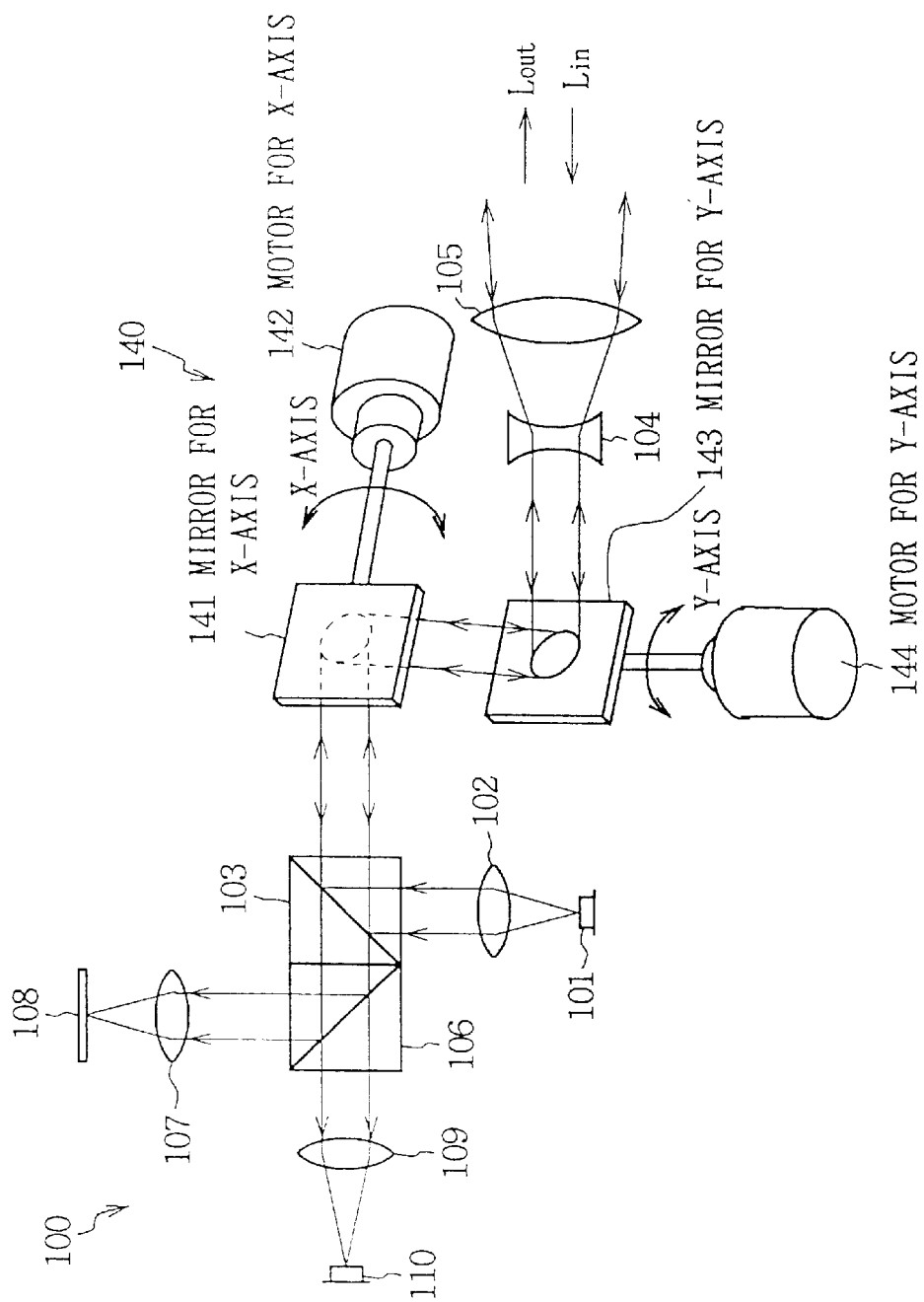
FIG. 3 is a block diagram showing the configuration of a conventional optical axis correcting apparatus.
Figure 4:
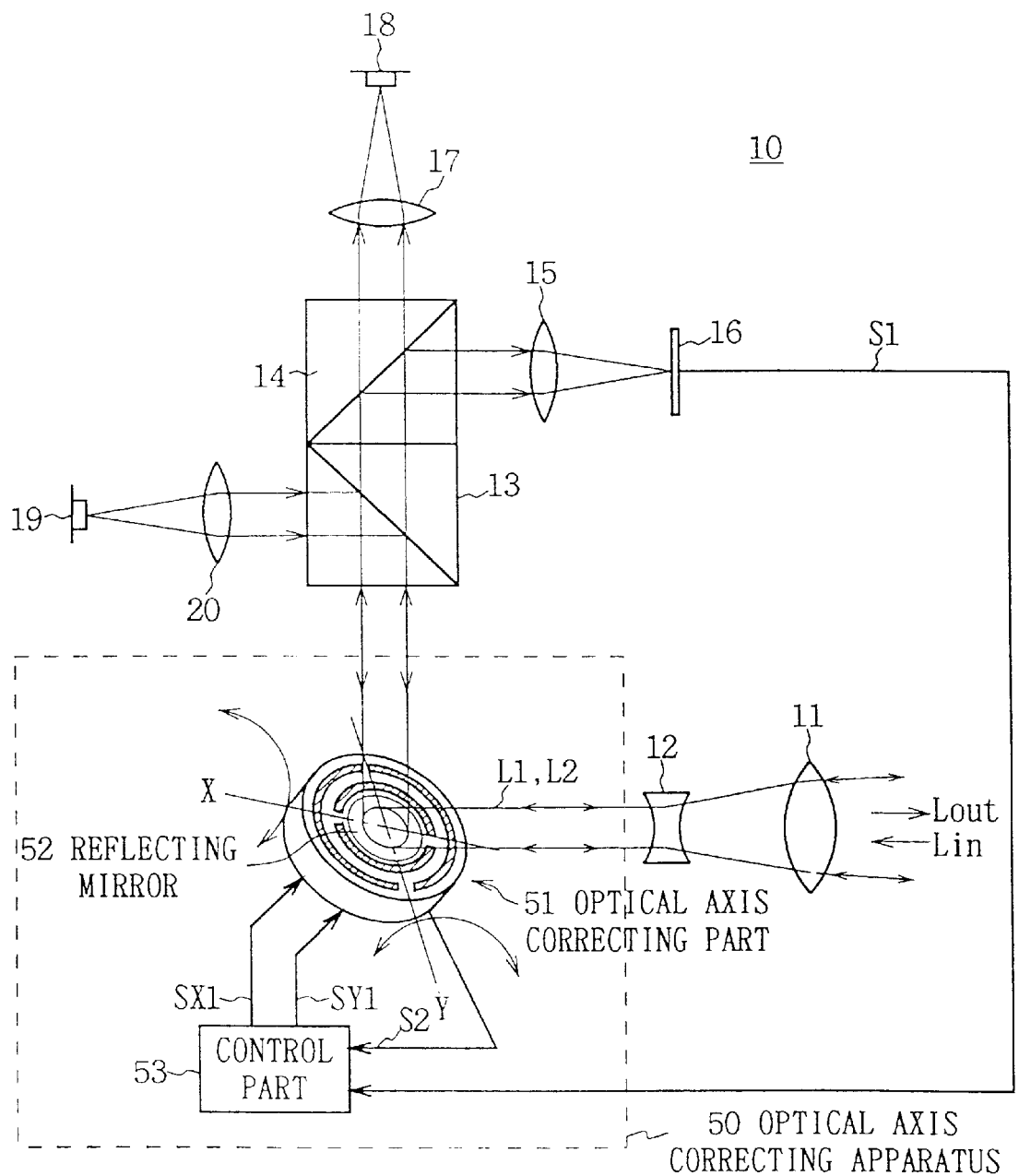
FIG. 4 is a block diagram showing the configuration of an optical space transmission system according to the embodiment of this invention.

Referring to FIG. 4, numeral 10 generally shows an optical space transmission system providing an optical axis correcting apparatus 50 of the present invention. A laser beam which is modulated based on an information signal and is emitted from a semiconductor laser 19 in transmission, is converted into a parallel beam L2 through a lens 20, is reflected by a beam splitter 13. Then, the parallel beam L2 is reflected by the reflecting mirror 52 of an optical axis correcting part 51 in an optical axis correcting apparatus 50, and then is emitted as an emitted beam $L_{out}$ through a concave lens 12 and a convex lens 11.

In reception, the optical space transmission system 10 converts an incident beam $L_{in}$ from the optical space transmission system of a communicating party (not shown in FIG. 4) into a parallel beam L1 through the convex lens 11 and the concave lens 12. The above parallel beam L1 is reflected by the reflecting mirror 52 of the optical axis correcting part 51 to pass through the beam splitter 13, and is reflected by a beam splitter 14 to converge on a position detecting sensor 16 through a lens 15. At the same time, the parallel beam L1 passes through the beam splitter 14 as it is to converge on a light receiving device 18 through a lens 17.

The light receiving device 18 restores an original signal by converting the converged optical signal into an electric signal and decoding it with the following stage of a signal processor (not shown). In this manner, the optical space transmission system 10 performs optical space transmission of data with the communicating optical space transmission system by laser beams. At this time, if there is no deviation in their optical axes, the optical axes of the emitted beams $L_{out}$ and incident beams $L_{in}$ are identical with each other.

The position detecting sensor 16 is a position sensitive device (PSD), for example, and transmits the light receiving level of the parallel beam L1 converging through the lens 15 and the light receiving position (x1, y1) of the parallel beam L1 on the X-Y coordinates of its light receiving surface to the control part 53 of the optical axis correcting apparatus 50 as a position signal S1.

Note that, the position signal S1 has received the influence of oscillation that occurs when the optical space transmission system 10 itself gets some disturbance and thereby, it is deviated from a position on the light receiving surface at which the original laser beam should be received.

The control part 53 calculates an amount of deviation between a reference position (0, 0) at which the parallel beam L1 having no deviation of optical axis should converge and the actual light receiving position (x1, y1), as an angular deviation used to move the rotary angle of the reflecting mirror 52 for correcting the optical axis, that is, as angular voltage signals ex(t) and ey(t). The control part 53 generates driving signals SX1 and SY1 used to adjust the rotary angle of the reflecting mirror 52 in the X-axis direction and in the Y-axis direction respectively based on that signals, and supplies them to the optical axis correcting part 51.

The optical axis correcting part 51 rotates the reflecting mirror 52 in X-axis direction and Y-axis direction based on the driving signals SX1 and SY1 respectively to adjust the optical axis of the incident beam $L_{in}$ to the reference position, so that the optical axes of the incident beams $L_{in}$ and the emitted beams $L_{out}$ are identical with each other.

(2) Configuration of Optical Axis Correcting Part

Figure 5:
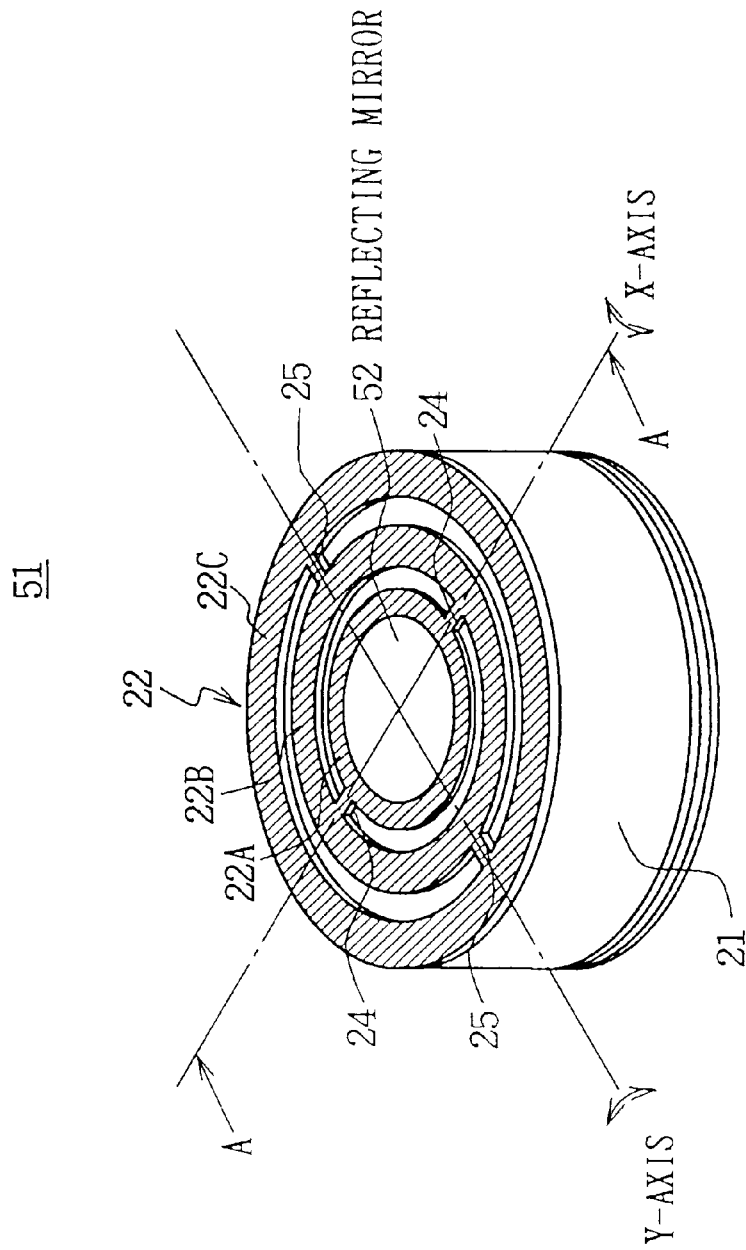
FIG. 5 is a schematic perspective view showing the configuration of an optical axis correcting part.

As shown in FIG. 5, in the optical axis correcting part 51, a two-axle spring 22 which has the approximately same outer diameter as a cylindrical frame body 21 and a prescribed thickness, is attached on the top of the frame body 21, and the reflecting mirror 52 having a prescribed diameter is attached in the almost center of the two-axle spring 22.

Figure 6:
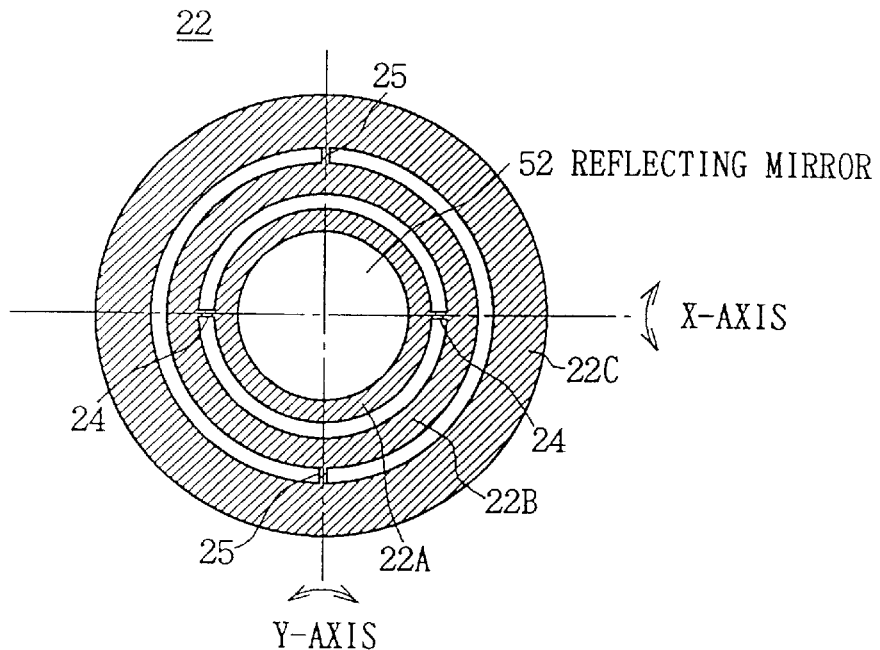
FIG. 6 is a schematic diagram showing the configuration of a two-axle spring.

This two-axle spring 22 is comprised of three concentric rings each made of an elastic plate having predetermined thickness plate, as shown in FIG. 6. The innermost ring 22A and the central ring 22B are connected by two X-axis bridges 24 separated by 180° from each other on the X-axis for the torsional rotation. And the central ring 22B and the outermost ring 22C are connected by two Y-axis bridges 25 separated by 180° from each other on the Y-axis orthogonal to the X-axis for torsional rotation.

That is, the two-axle spring 22 makes the two X-axis bridges 24 perform torsional rotation on X-axis to rotate the reflecting mirror 52 on X-axis, and makes the two Y-axis bridges 25 perform torsional rotation on Y-axis to rotate the reflecting mirror 52 on the Y-axis.

Figure 7:
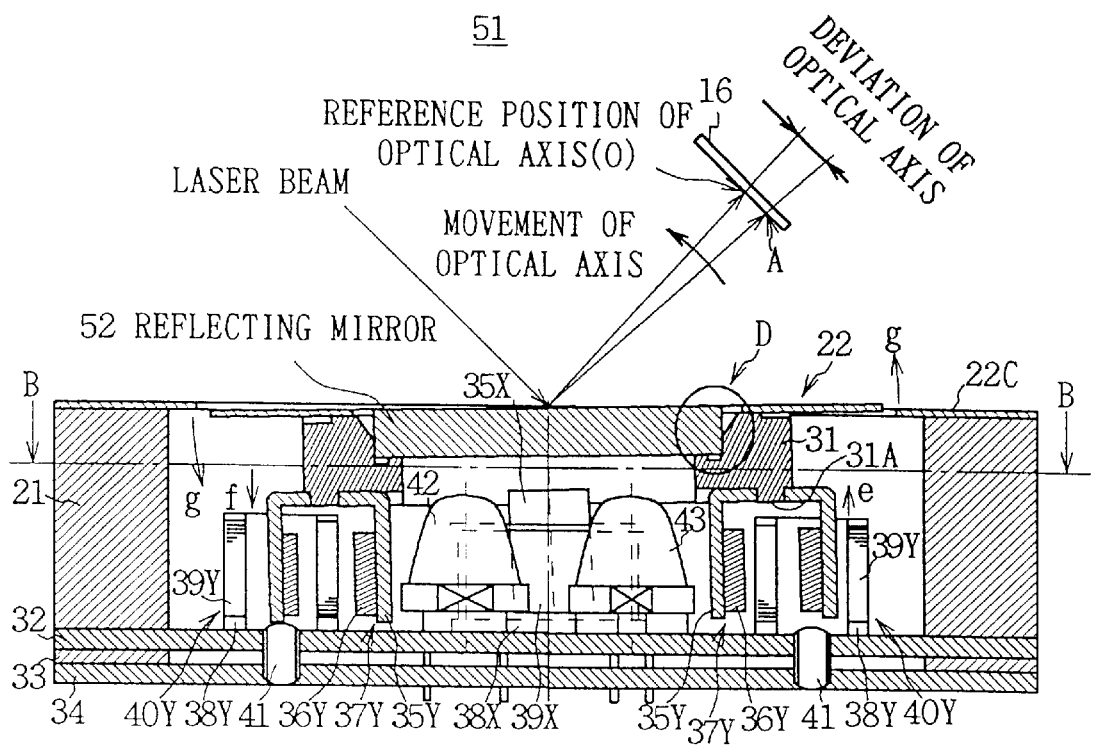
FIG. 7 is a schematic cross section illustrating the internal configuration of the optical axis correcting part.

The interior configuration of the optical axis correcting part 51 will be described in detail with reference to FIG. 7 illustrating the cross section of a line A—A in FIG. 5. As shown in FIG. 7, in the optical axis correcting part 51, the outermost ring 22C of the two-axle spring 22 is fixed on the surrounding surface of the frame body 21. Further, the reflecting mirror 52 is fixed to a mirror holder 31 held by the ring 22A of the two-axle spring 22 (FIG. 6).

Figure 8:
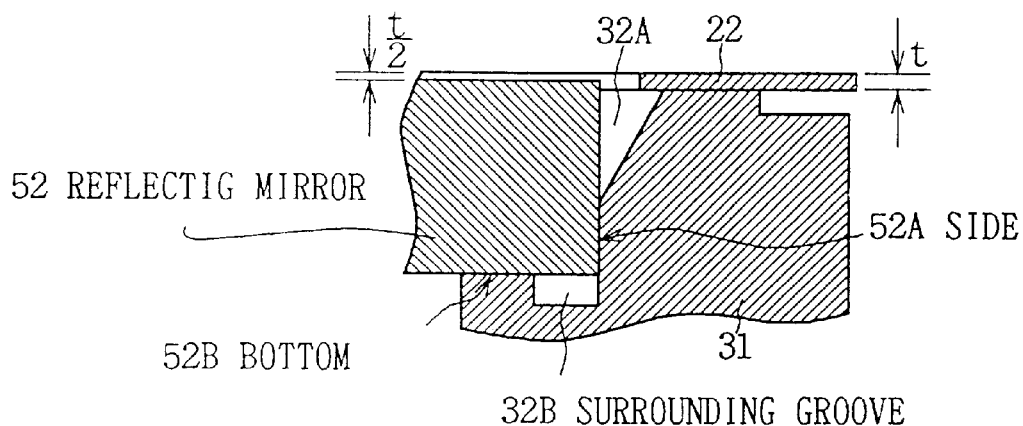
FIG. 8 is a schematic cross section illustrating the configuration of a mirror mounting part.

In this case, after the reflecting mirror 52 is positioned in the state where the side 52A and the bottom 52B are abutted against the mirror holder 31 as shown in FIG. 8, the side 52A and the mirror holder 31 are fixed by adhesive poured into a surrounding notch part 32A formed around the reflecting mirror 52. Even if too much adhesive causes overflow from the abutted surface of the side 52A and the mirror holder 31, it can be received by a surrounding groove 32B.

Accordingly, the optical axis correcting part 51 can prevent the bottom 52B of the reflecting mirror 52 from adhering to the mirror holder 31. Thus, the reflecting mirror 52 can be prevented from cambering or warping.

In this connection, it has been so designed that the optical axis correcting surface of the reflecting mirror 52, i.e., the reflecting surface for laser beams, is the same height as the center of the torsional rotation that is the middle of the thickness "t" of the two-axle spring 22 (a line of t/2 from the surface of the two-axle spring 22). Thereby, in the optical axis correcting part 51, the optical axis correcting surface of the reflecting mirror 52 is the same height as the center of the torsional rotation, so that the optical axis can be accurately corrected without moving the optical axis correcting surface forward or backward when the reflecting mirror 52 is rotated.

To the bottom surrounding surface of the frame body 21 (FIG. 7), a base plate 32 is fixed and a base plate 34 is attached inserting a ring-shaped spacer 33 between them. In the space formed by this base plate 34, the two-axle spring 22 and the frame body 21, a driving mechanism for X-axially and Y-axially rotating the reflecting mirror 52 and a detecting mechanism for detecting the actual rotary angle of the reflecting mirror 52 are provided.

The driving mechanism for Y-axis for rotating the reflecting mirror 52 on Y-axis, in this embodiment, is a so-called moving magnet-type voice coil motor that is composed of a movable part 37Y formed by a yoke 35Y fixed to the projected part 31A of the mirror holder 31 and a magnet 36Y fixed on the inner surface of the yoke 35Y, and a fixed part 40Y formed by a reel 38Y fixed on the base plate 32 and a coil 39Y wound onto the reel 38Y.

That is, by making a plus or a minus current flowing along the coil 39Y of the fixed part 40Y, driving power under the Fleming's left-hand rule is generated between the coil 39Y and the magnet 36Y. As a result, the movable part 37Y moves in a direction shown by arrow "e" or in the reverse direction.

In the optical axis correcting part 51, another voice coil motor having the structure is also provided on an opposite side of the reflecting mirror 52. These two voice coil motors are driven in a pair in the directions shown by the arrow "e" and an arrow "f" or in the reverse directions. This inclines the mirror holder 31 fixed to the movable part 37Y together with the two-axle spring 22.

In this way, in the optical axis correcting part 51, the ring 22B of the two-axle spring 22 is inclined by the driving mechanism for Y-axis and at the same time, the two Y-axis bridges 25 are twisted. Therefore, power of Y-axis bridges 25 intending to restore itself rotates the reflecting mirror 52 by the prescribed angle in the direction shown by an arrow "g" or in the reverse direction (i.e., rotary-direction on Y-axis), and thus its position is determined.

Similarly, the optical axis correcting part 51 also has a pair of voice coil motors having the same configuration as the aforementioned pair of voice coil motors on opposite sides of the reflecting mirror 52 on Y-axis (FIG. 5). A driving mechanism for X-axis on Y-axis inclines the ring 22A and at the same time, twists the two X-axis bridges 24 to rotate the reflecting mirror 52 by the prescribed angle in the rotary-direction on the X-axis. In this way its position is determined.

Figure 9:
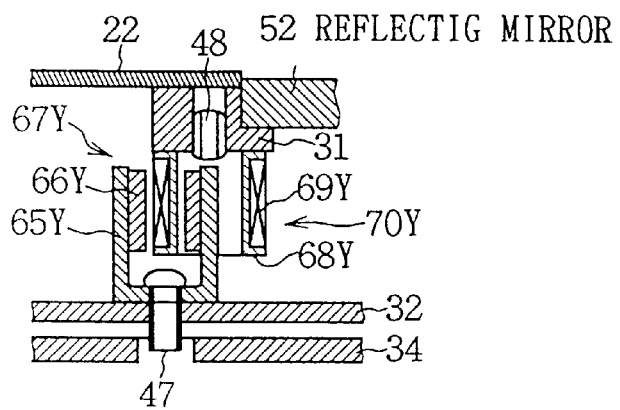
FIG. 9 is a schematic cross section illustrating the configuration of a moving coil type of voice coil motor.

Note that, in the optical axis correcting part 51, the moving magnet-type voice coil motors are used. However, moving coil-type voice coil motors as shown in FIG. 9 can be used.

In this case, in the optical axis correcting part 51, a movable part 70Y is formed in the state where a reel 68Y having the coil 69Y wounded thereon are fixed to the mirror holder 31 holding the reflecting mirror 52, and a fixed part 67Y is formed in the state where a yoke 65Y having a magnet 66Y fixed to its inner surface is fixed to the base plate 32 by a bolt 47. Further, a stopper 48 to limit the rotation of the reflecting mirror 52 that rotates in accordance with the movement of the movable part 70Y is embedded in the mirror holder 31.

In the optical axis correcting part 51 (FIG. 7), a stopper 41 is fixed to the prescribed position of the base plate 32 opposite to the yoke 35Y of the movable part 37Y through the base plate 32 and the base plate 34 to limit the rotary angle of the reflecting mirror 52 on Y-axis within the prescribed range. This stopper 41 is also provided on Y-axis to limit the rotary angle of the reflecting mirror 52 on X-axis within the prescribed range.

Figure 10:
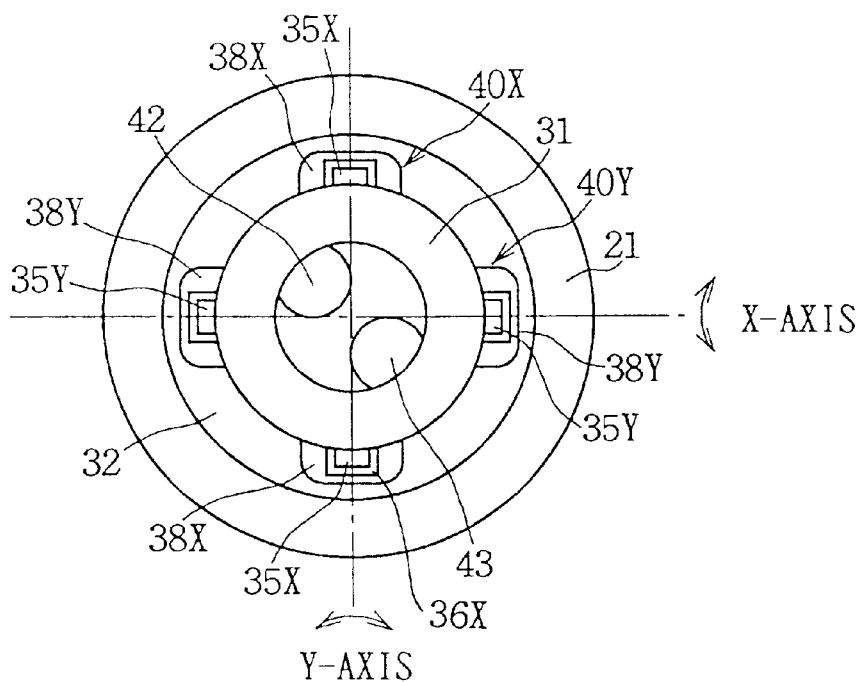
FIG. 10 is a schematic diagram showing the arrangement of driving mechanism.

Next, the arrangement of the driving mechanisms on X-axis and the driving mechanisms on Y-axis for the reflecting mirror 52 in the optical axis correcting part 51 will be described with reference to FIG. 10. In the optical axis correcting part 51, a pair of driving mechanisms on X-axis is formed for rotating the reflecting mirror 52 on X-axis in such a way that the yokes 35X each having the magnet 36X are fixed on opposite side of the X-axis of the mirror holder 31 and at the same distance from the center, and the reels 38X each having the coil 39X wounded thereon are fixed on the outside base plate 32 of the yoke 35X.

This driving mechanisms on X-axis generate a pair of powers equal in size, opposite with each other, and in parallel (that is, couple), and flows current along the coil 39X to rotate the reflecting mirror 52 in the rotary-direction on X-axis. In this case, this X-axis corresponds to the X-axis bridges 24 in FIGS. 5 and 6, and the X-axis bridges 24 are twisted and rotate the reflecting mirror 52 on X-axis.

On the other hand, in the optical axis correcting part 51, a pair of driving mechanisms on X-axis is formed for rotating the reflecting mirror 52 on Y-axis in such a way that the yokes 35Y each having the magnet 36Y are fixed on opposite sides of Y-axis of the mirror holder 31 at the same distance from the center and the reels 38Y each having the coil 39Y wounded thereon are fixed on the outside base plate 32 of the yoke 35Y.

This driving mechanisms on X-axis, similarly, generate a pair of powers equal in size, opposite with each other, and in parallel (that is, couple), and flows current along the coil 39Y to rotate the reflecting mirror 52 on Y-axis in the rotary-direction. In this case, this Y-axis corresponds to the Y-axis bridges 25 in FIGS. 5 and 6, and the Y-axis bridges 25 are twisted to rotate the reflecting mirror 52 on Y-axis.

Figure 11:
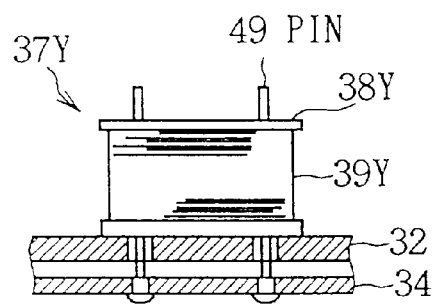
FIG. 11 is a schematic cross section illustrating the attached state of a fixed part.

Note that, in the movable part 37Y in the driving mechanism on X-axis, two pins 49 penetrate the reel 38Y having the coil 39Y wound thereon as shown in FIG. 11. These pins 49 are fixed to the base plate 34 through the base plate 32 with solder to be positioned on the base plate 32. In this case, in the movable part 37Y, the coil 39Y and each circuit (e.g., the control part 53) provided on the base plate 34 are electrically connected to each other by the pins 49.

By the way, in the optical axis correcting part 51 (FIG. 7), an angle detecting sensor for Y-axis 42 for detecting the rotary angle on Y-axis and an angle detecting sensor for X-axis 43 for detecting the rotary angle on the X-axis are fixed to the base plate 32 and the base plate 34 for the movement of the reflecting mirror 52.

The angle detecting sensor for Y-axis 42 and the angle detecting sensor for X-axis 43 are composed of light-emitting elements and light-receiving elements that are integrated. The reflecting surface that is the back of the reflecting mirror 52 is irradiated with lights from the light-emitting elements. The reflected light from the reflecting surface is received, and the received position (x2, y2) of the reflected light received is detected on the XY coordinates. The detected position is transmitted to the control part 53 of the optical axis correcting apparatus 50 as a position signal S2 (FIG. 4).

The control part 53 generates drive signals SX1 and SY1 to move the reflecting mirror 52 by a desired rotary angle based on the position signals S1 and S2 respectively, and transmits them to the optical axis correcting part 51.

By the way, if the laser beam is off the light receiving surface of the position detecting sensor 16, the control part 53 cannot accurately recognize the current rotary angle of the reflecting mirror 52. As a result, the rotary angle of the reflecting mirror 52 cannot be controlled to correct the optical axis.

Therefore, in the case where an incident light $L_{IN}$ from the communicating party is incident through the convex lens 11 and the concave lens 12 within the prescribed range, the control part 53 previously restricts the rotary angle of the reflecting mirror 52 with the stopper 41 so that the laser beam is incident on the light receiving surface of the position detecting sensor 16, in order to always detect the angular voltage signals ex(t) and ey(t) of the optical axis by the position detecting sensor 16.

The stopper 41 is controllable to move in the vertical direction with respect to the base plate 32, and limits the rotary angle of the reflecting mirror 52 by adjusting a position where the tip part of the yoke 35Y abuts. Here, the yoke 35Y is attached so that the magnet 36Y provided on its inner surface does not project from its surrounding end surface, to prevent the magnet 36Y from being damaged when the yoke 35Y itself contacts the stopper 41.

In this manner, in the optical space transmission system 10, the rotary angle of the reflecting mirror 52 is limited by the stopper 41. Thus, the angular voltage signals ex(t) and ey(t) of the position signal S1 can always be detected by the position detecting sensor 16. Thus the optical axis can always stably be corrected by the optical axis correcting apparatus 50 based on that detected result.

Next, in the optical space transmission system 10, to make an optical system which has the optical axis correcting apparatus 50 have a compatibility, the installing angles for the angle detecting sensor for Y-axis 42 and for the angle detecting sensor for X-axis 43 must be adjusted so that the origin of the reflecting mirror 52 is the same as the origins of the angle detecting sensor for Y-axis 42 and of the angle detecting sensor for X-axis 43 in the optical axis correcting apparatus 50.

Figure 12:
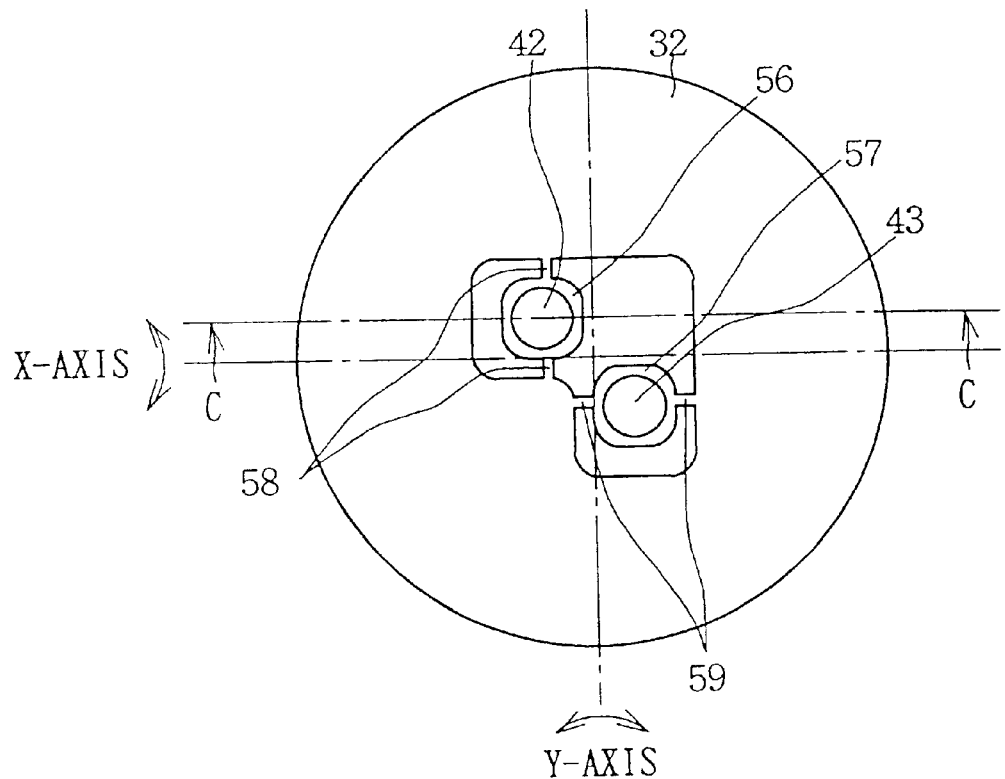
FIG. 12 is a schematic diagram showing the position on a base plate where angle detecting sensors are attached.

As shown in FIG. 12, the angle detecting sensor for Y-axis 42 and the angle detecting sensor for X-axis 43 on the base plate 32 of the optical axis correcting apparatus 50 are provided at the prescribed positions on the base plate 32, to be mounted on a Y-axis angle detecting sensor mounting part 56 and an X-axis angle detecting sensor mounting part 57 each having a prescribed form and a size larger than the sensor 42 or 43.

The Y-axis angle detecting sensor mounting part 56 and the X-axis angle detecting sensor mounting part 57 are held on the base plate 32 by a bridge for Y-axis angle detecting sensor 58 and a bridge for X-axis angle detecting sensor 59, respectively. Each of them is twisted on Y-axis or on X-axis, so that the installing angles for the mounted angle detecting sensor for Y-axis 42 and angle detecting sensor for X-axis 43 can be adjusted.

Figure 13:
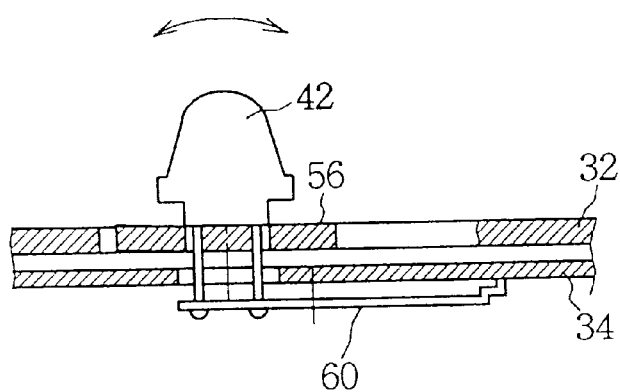
FIG. 13 is a schematic cross section illustrating the state where the angle detecting sensor is attached on the base plate.

As shown in FIG. 13, since the angle detecting sensor for Y-axis 42 is mounted on the Y-axis angle detecting sensor mounting part 56 held on the base plate 32 and the bridge for Y-axis angle detecting sensor 58 (FIG. 12) is twisted, thereby the installing angle is adjusted on Y-axis shown by an arrow.

This angle detecting sensor for Y-axis 42 is electrically connected to the base plate 34 through a flexible base plate 60, and transmits the detected result to the control part 53 of the base plate 34. Thereby, the control part 53 easily can adjust the angle of the angle detecting sensor for Y-axis 42 based on the detected result. In addition, the control part 53 can adjust the angle while confirming the detected results of the angle detecting sensor for Y-axis 42 and the angle detecting sensor for X-axis 43. It can attain accurate angle adjustment and efficient assembly work of the optical axis correcting apparatus 50 in the optical system.

In this manner, in the optical space transmission system 10, when the optical axis correcting apparatus 50 is provided in the optical system, the stopper 41 is put through the base plate 32 and the base plate 34 while rotating the reflecting mirror 52 based on the detected results of the angle detecting sensor for Y-axis 42 and the angle detecting sensor for X-axis 43 so that a laser beam is incident on the light receiving surface of the position detecting sensor 16. In this way, the range of the rotary angle of the reflecting mirror 52 can be set.

(3) Control of Optical Axis Correction

In the optical axis correcting apparatus 50 (FIG. 4), the rotary angle of the actually moved reflecting mirror 52 of the optical axis correcting part 51 is detected by the angle detecting sensor for Y-axis 42 and the angle detecting sensor for X-axis 43 as the position signal S2. This position signal S2 is equivalent to the position signal S1 as long as the light receiving surface of the position detecting sensor 16 is irradiated with light beams.

Figure 14:
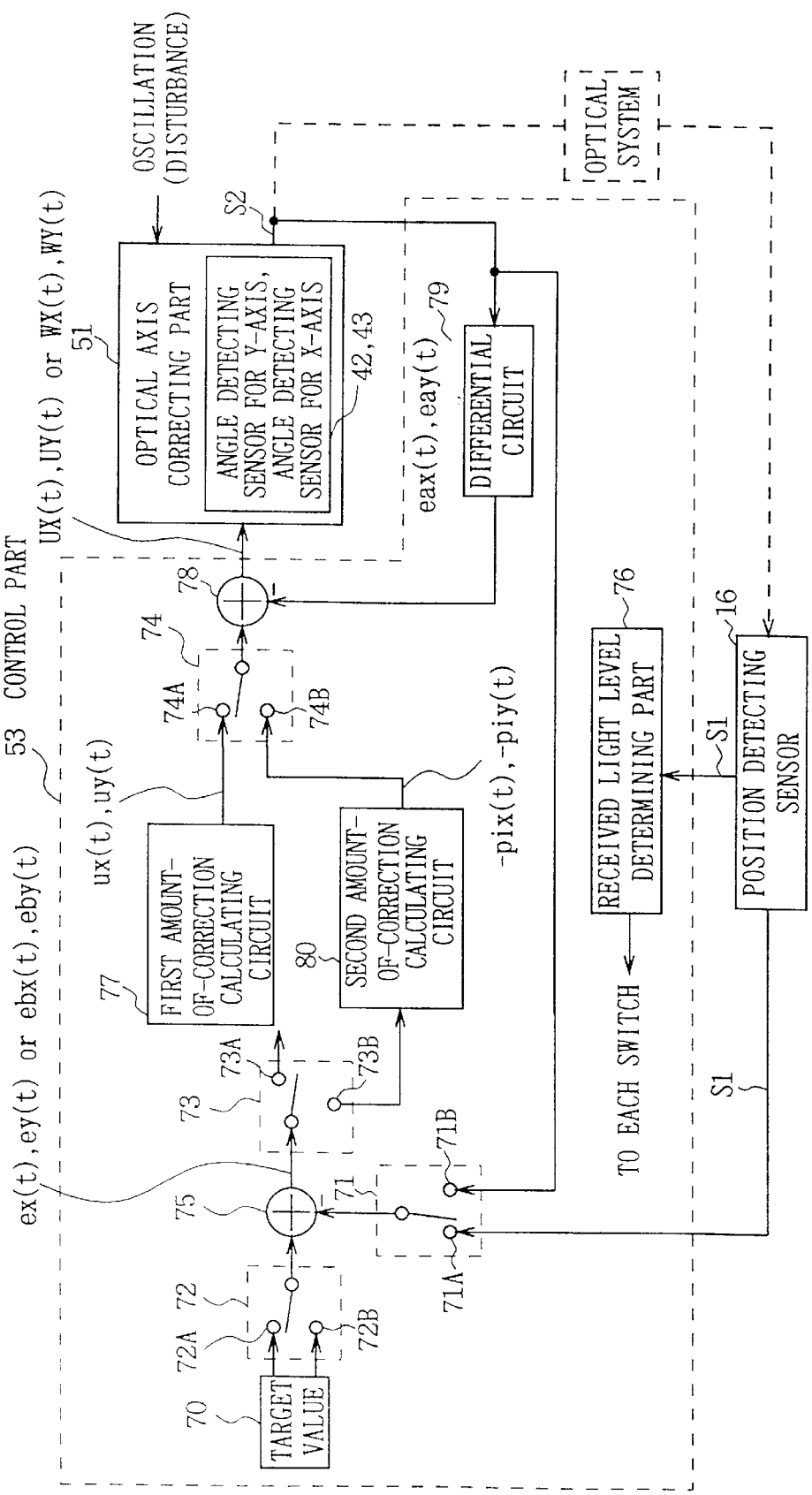
FIG. 14 is a block diagram showing the configuration of the control part of an optical axis correcting part.

That is, in the optical axis correcting apparatus 50, as shown in FIG. 14, if oscillation owing to disturbance is applied to the apparatus, an oscillation component is also propagated to the optical axis correcting part 51. Thus, the position detecting sensor 16 is irradiated through the optical system with a laser beam having a deviation equivalent to the position signal S2 including the influence of this oscillation component.

The position detecting sensor 16 receives the laser beam with the light receiving surface, detects the received light position (x1, y1) and transmits it to a changeover terminal 71A of a switching circuit 71 of the control part 53 as the position signal S1 including the oscillation component, as well as transmitting it to a received light level determining part 76. Here, the position signal S1 includes not only the received light position (x1, y1) but also a light received level.

If the received light level of the position signal S1 is higher than a prescribed threshold level, the received light level determining part 76 determines that the received light position (x1, y1) could be detected accurately by the position detecting sensor 16 being an external sensor, and switches to changeover terminals 71A to 74A in the switch circuits 71 to 74 to start the control of optical axis correction in normal mode.

In the control of optical axis correction in a normal mode, the received light position (x1, y1) represented by the position signal S1 inputted in the changeover terminal 71A of the switching circuit 71 is transmitted to a computing element 75. Here, a reference position (0, 0) showing the center of the light receiving surface of the position detecting sensor 16 has been read from a memory 70 and supplied to the computing element 75 as target value data.

Accordingly, the computing element 75 computes an amount of deviation between the reference position (0, 0) and the received light position (x1, y1) as an angular deviation in the reflecting mirror 52, that is, as the angular voltage signals ex(t) and ey(t), and transmits them to a first amount-of-correction calculating circuit 77 through the changeover terminal 73A of the switching circuit 73.

The first amount-of-correction calculating circuit 77 calculates, based on the angular voltage signals ex(t) and ey(t) from the position detecting sensor 16, an amount-of-correction in x-direction ux(t) and an amount-of-correction in y-direction uy(t) by the following expressions:

$$ux(t) = Kp\left(ex(t) + 1/Ti \cdot \int ex(t)dt + Td \cdot \frac{d\,ex(t)}{dt}\right) \quad (1)$$

(Kp, Ti and Td are constant)

$$uy(t) = Kp\left(ey(t) + 1/Ti \cdot \int ey(t)dt + Td \cdot \frac{d\,ey(t)}{dt}\right) \quad (2)$$

(Kp, Ti and Td are constant)

Then, these values are transmitted to a computing element 78 through the changeover terminal 74A of the switching circuit 74.

The amount-of-correction in x-direction ux(t) and the amount-of-correction in y-direction uy(t) represent how much the reflecting mirror 52 should be rotated in a direction corresponding to the angular voltage signals ex(t) and ey(t), by a desired angle at a prescribed velocity, for correcting an optical axis. That is, the control part 53 performs PID (P: proportional, I: integral, D: differential) control.

By the way, a differential circuit 79 calculates the received light position (x2, y2) of the position signal S2 detected by the angle detecting sensor for Y-axis 42 and the angle detecting sensor for X-axis 43 provided inside the optical axis correcting apparatus 50, and an amount of deviation from the received light position one sampling before, as angular deviation of the time when oscillation leads to movement of the reflecting mirror 52, i.e., as interior angular voltage signals eax(t) and eay(t).

Then, the differential circuit 79 differentiates the interior angular voltage signals eax(t) and eay(t) with respect to "t" to obtain a rotary angular velocity in x-direction vx(t) and a rotary angular velocity in y-direction vy(t) of the reflecting mirror 52:

$$vx(t) = Kp \cdot Tda \cdot \frac{d\,eax(t)}{dt} \quad (3)$$

($Kp \cdot Tda$ is constant)

$$vy(t) = Kp \cdot Tda \cdot \frac{d\,eay(t)}{dt} \quad (4)$$

($Kp \cdot Tda$ is constant)

Then, these vales are transmitted to the computing element 78. In this case, the rotary angular velocity in x-direction vx(t) and the rotary angular velocity in y-direction vy(t) are high-frequency angular velocity components when the reflecting mirror 52 rapidly moves owing to the oscillation component by disturbance.

The computing element 78 adds the amount-of-correction in x-direction ux(t) and the amount-of-correction in y-direction uy(t) of the reflecting mirror 52 calculated by the first amount-of-correction calculating circuit 77 to the minus values of the rotary angular velocity in x-direction vx(t) and the rotary angular velocity in y-direction vy(t) of the reflecting mirror 52 calculated by the differential circuit 79, respectively, to obtain an amount-of-manipulation in X-direction UX(t) and an amount-of-manipulation in Y-direction UY(t) of the reflecting mirror 52 from the following expressions (5) and (6):

$$UX(t) = Kp\left(ex(t) + 1/Ti \cdot \int ex(t)dt + Td \cdot \frac{d\,ex(t)}{dt} - Tda \cdot \frac{d\,eax(t)}{dt}\right) \quad (5)$$

($Kp \cdot Ti \cdot Td \cdot Tda$ is a constant)

$$UY(t) = Kp\left(ey(t) + 1/Ti \cdot \int ey(t)dt + Td \cdot \frac{d\,ey(t)}{dt} - Tda \cdot \frac{d\,eay(t)}{dt}\right) \quad (6)$$

($Kp \cdot Ti \cdot Td \cdot Tda$ is a constant)

Then, these values are supplied to the optical axis correcting part 51.

As a result, the amount-of-manipulation in X-direction UX(t) and the amount-of-manipulation in Y-direction UY(t) are inputted to the optical axis correcting part 51 for adjusting the rotary angle of the reflecting mirror 52 based on the detected result by the position detecting sensor 16 and for controlling the movement if the oscillation component by disturbance leads to movement of the reflecting mirror 52.

By the way, under the control of correcting an optical axis in a normal mode, if the light receiving surface of the position detecting sensor 16 is not instantaneously irradiated with the laser beam owing to obstructions, the angular voltage signals ex(t) and ey(t) become "0". Therefore, all values corresponding to the amount-of-correction in x-direction ux(t) and the amount-of-correction in y-direction uy(t) in the expressions (5) and (6) become "0" and disappear from the control part 53.

In the control part 53, however, the values corresponding to the rotary angular velocity in x-direction vx(t) and the rotary angular velocity in y-direction vy(t) obtained by the expressions (3) and (4) are angular velocity components by the oscillation components obtained based on the interior angular voltage signals eax(t) and eay(t) detected by the internal angle detecting sensor for Y-axis 42 and angle detecting sensor for X-axis 43, so that they remain as data without disappearing.

Accordingly, the control part 53 supplies a minus rotary angular velocity in x-direction vx(t) and a minus rotary angular velocity in y-direction vy(t) to the optical axis correcting part 51. Therefore, after the reflecting mirror 52 is rotated back by the amount of rotation owing to the oscillation component by disturbance, it can be kept in that position (restored position).

In this way, the control part 53 can prevent that oscillation components lead to movement of the reflecting mirror 52 of the optical axis correcting part 51 in the case where the light receiving surface of the position detecting sensor 16 is not instantaneously irradiated with the laser beams owing to obstructions in the middle of the control of correcting an optical axis in a normal mode.

Then, when the light receiving surface of the position detecting sensor 16 comes to be irradiated with the laser beams again, the control part 53 can immediately adjust the rotary angle of the reflecting mirror 52 based on the amount-of-manipulation in X-direction UX(t) and the amount-of-manipulation in Y-direction UY(t) to restart the optical axis correction. At the same time, the control part 53 can restrain the useless movement of the reflecting mirror 52 owing to disturbance to execute the stable optical axis correction. The description of the control of correcting an optical axis in a normal mode is finished here.

On the other hand, if the light receiving level of the position signal S1 is lower than a prescribed threshold level, the received light level determining part 76 determines that it can not accurately detect the received light position (x1, y1) of the position signal S1 because the light receiving surface of the position detecting sensor 16 being an external sensor is not irritated with the laser beams owing to too much deviation in the optical axis or to any obstruction generated on the optical axis or because rain or wind, etc., leads to lowering of the received light level of the position signal S1. At this time, the switching circuits 71 to 74 are switched to the changeover terminals 71B to 74B to start the control of correcting an optical axis in a disturbance-preventing mode.

In the control part 53 under the control of correcting an optical axis in the disturbance-preventing mode, if the switching circuits 71 to 74 are switched to the changeover terminals 71B to 74B respectively by the control of the received light level determining part 76, the position signal S2 outputted from the angle detecting sensor for Y-axis 42 and the angle detecting sensor for X-axis 43 of the optical axis correcting part 51 are supplied to the computing element 75 through the changeover terminal 71B of the switching circuit 71.

Furthermore, at this time, the current received light position of the angle detecting sensor for Y-axis 42 and the angle detecting sensor for X-axis 43 just before the laser beam is off the light receiving surface of the position detecting sensor 16 is supplied from the memory 70 to the computing element 75 through the changeover terminal 72B of the switching circuit 72 as a new target value. This new target value is supplied from the optical axis correcting part 51 to the memory 70 to be updated whenever the current received light positions of the angle detecting sensor for Y-axis 42 and the angle detecting sensor for X-axis 43 just before the laser beam is off the light receiving surface of the position detecting sensor 16 changes.

The computing element 75 calculates an amount of deviation between the new target value just before the laser beam is off the light receiving surface of the position detecting sensor 16 and the received light position (x2, y2) of the position signal S2, as an angular deviation for what the reflecting mirror 52 moves owing the oscillation component by disturbance, i.e., as oscillation angular voltage signals ebx(t) and eby(t). Then, these values are transmitted to a second amount-of-correction calculating circuit 80 through the changeover terminal 73B of the switching circuit 73.

The second amount-of-correction calculating circuit 80 calculates, using the oscillation angular voltage signals ebx(t) and eby(t), minus proportional integral correcting amounts −pix(t) and −piy(t) of the reflecting mirror 52 by the following expressions (7) and (8):

$$-pix(t) = -Kp'(ebx(t) + 1/Ti' \cdot \int ebx(t)dt) \quad (7)$$

(Kp', Ti' are constant)

$$-piy(t) = -Kp'(eby(t) + 1/Ti' \cdot \int eby(t)dt) \quad (8)$$

(Kp', Ti' are constant)

Then, these values are transmitted to the computing element 78 through the changeover terminal 74B of the switching circuit 74.

Here, the minus proportional integral correcting amounts −pix(t) and −piy(t) are used as minus values because they are data used to correct the reflecting mirror 52, which has moved owing to the oscillation component by disturbance, by the deviation from the new target value.

The computing element 78 adds the minus values of the rotary angular velocity in x-direction vx(t) and the rotary angular velocity in y-direction vy(t) of the reflecting mirror 52 obtained by the differential circuit 79 to the minus proportional integral correcting amounts −pix(t) and −piy(t) of the reflecting mirror 52 obtained by the second amount-of-correction calculating circuit 80 respectively, to obtain an amount-of-correction in X-direction WX(t) and an amount-of-correction in Y-direction WY(t) by the following expressions (9) and (10):

$$WX(t) = -Kp'\left(ebx(t) + 1/Ti' \cdot \int ebx(t)dt\right) - Kp \cdot Tda \cdot \frac{d\, eax(t)}{dt} \quad (9)$$

(Kp', Ti' and Tda are constant)

$$WY(t) = -Kp'\left(eby(t) + 1/Ti' \cdot \int eby(t)dt\right) - Kp \cdot Tda \cdot \frac{d\, eay(t)}{dt} \quad (10)$$

Kp', Ti' and Tda are constant)

Then, these values are supplied to the optical axis correcting part 51. Here, the amount-of-correction in X-direction WX(t) and the amount-of-correction in Y-direction WY(t) are amount of correction to rotate the reflecting mirror 2 back by the amount of rotation when the oscillation component leads to oscillation of the optical axis correcting part 51 itself and to keep it in that position.

The optical axis correcting part 51 turns back the reflecting mirror 52 by the amount of rotation owing to the oscillation component based on the amount-of-correction in X-direction WX(t) and the amount-of-correction in Y-direction WY(t) and keep its position. Thus, the reflecting mirror 52 can be kept at the position of the rotary angle just before the light receiving level of the laser beam being incident on the light receiving surface of the position detecting sensor 16 becomes lower than the prescribed threshold level, that is, at the position of the rotary angle when the position signal S1 can be detected accurately.

Therefore, the control part 53 determines that it can not accurately detect the position signal S1, when the laser beam is off the light receiving surface of the position detecting sensor 16 being an external sensor because of too much deviation in optical axis or when the light receiving level of the position signal S1 is lower than the threshold level owing to rain or fog, etc. Then the control part 53 keeps the reflecting mirror 52 of the optical axis correcting part 51 at the position of the rotary angle just before the determination, and when the light receiving surface of the position detecting sensor 16 starts to be irradiated with the laser beam, the optical axis can be restart to be corrected immediately at that position. The description of the control of correcting an optical axis in disturbance-preventing mode is finished here.

Figure 15:
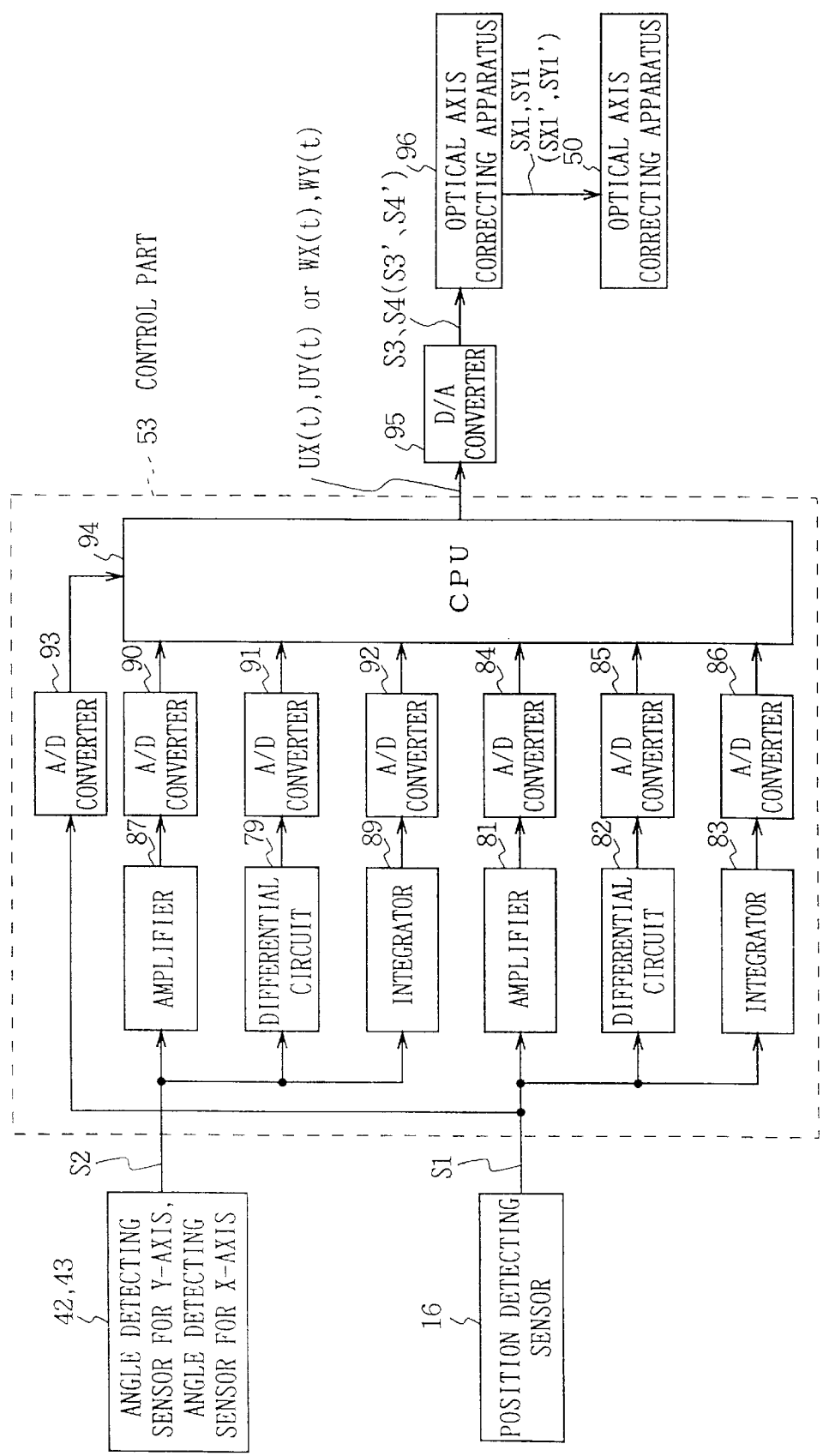
FIG. 15 is a block diagram showing the concrete circuitry of the control part.

Hereinafter, the concrete configuration of the control part 53 will be described with reference to FIG. 15. The control part 53 transmits the position signal S1 from the position detecting sensor 16 to the amplifier 81, differential circuit 82 and integrator 83 of the control part 53.

The amplifier 81 multiplies a constant Kp shown in expressions (1) and (2) by the angular voltage signals ex(t) and ey(t) that are difference between the reference position (0, 0) and the received light position (x1, y1) respectively represented by the position signal S1, that is, amplifies the angular voltage signals ex(t) and ey(t) into the prescribed level (Kp·ex(t), Kp·ey(t)), to obtain proportionals. Then, these are converted into digital data by an A/D converter 84, and are transmitted to a CPU 94.

The differential circuit 82 differentiates the angular voltage signals ex(t) and ey(t) that are difference between the reference position (0, 0) and the received light position (x1, y1) represented by the position signal S1 respectively, as shown by the expressions (1) and (2), and multiplies it by the constants Kp and Td, to obtain differential terms in the prescribed level (Kp·Td·dex(t)/dt, Kp·Td·dey(t)/dt). Then, these are converted into digital data by an A/D converter 85, and are transmitted to the CPU 94.

And the integrator 83 integrates the angular voltage signals ex(t) and ey(t) that are difference between the reference position (0, 0) and the received light position (x1, y1) represented by the position signal S1 respectively, as shown by the expressions (1) and (2) and multiplies them by the constants Kp and 1/Ti, to obtain integral terms in the prescribed level (Kp·1/Ti·∫ex(t)dt, Kp·1/Ti·∫ey(t)dt). Then, these are converted into digital data by an A/D converter 86, and then are transmitted to the CPU 94.

By the way, the control part 53 transmits the position signals S2 from the angle detecting sensor for Y-axis 42 and the angle detecting sensor for X-axis 43 provided inside the optical axis correcting apparatus 50, to an amplifier 87, the differential circuit 79 and an integrator 89.

The amplifier 87 obtains difference between the received light position (x2, y2) of the position signal S2 and the new target values being the detected results by the angle detecting sensor for Y-axis 42 and the angle detecting sensor for X-axis 43 just before the laser beam is off the light receiving surface of the position detecting sensor 16, to calculate an angular deviation when the reflecting mirror 52 actually moves from the new target value owing to the oscillation by disturbance as oscillation angular voltage signals ebx(t) and eby(t). Then, the amplifier 87 multiplies a constant −Kp' shown in the expressions (7) and (8) by the oscillation angular voltage signals ebx(t) and eby(t), that is, amplifies the oscillation angular voltage signals ebx(t) and eby(t) into the prescribed level (−Kp'·ebx(t), −Kp'·eby(t)), to obtain proportionals. Then, these are converted into digital data by an A/D converter 90, and are transmitted to the CPU 94.

The differential circuit 79 obtains difference between the received light position (x2, y2) of the position signal S2 and the received light position one sampling before, to calculate the interior angular voltage signals eax(t) and eay(t). Then, it differentiates them as shown by the expressions (3) and (4) and multiplies them by the constants Kp and Tda, to obtain a differential output in the prescribed level (Kp·Tda·deax(t)/dt, Kp·Tda·deay(t)/dt). Then, this is converted into digital data by an A/D converter 91, and is transmitted to the CPU 94.

In addition, the integrator 83 calculates oscillation angular voltage signals ebx(t) and eby(t) similarly to the amplifier 87, integrates them as shown by expressions (7) and (8), and multiplies them by constants −Kp' and 1/Ti', to obtain an integral output in the prescribed level (−Kp'·1/Ti'·∫ebx(t)dt, −Kp1'·1/Ti'·∫eby(t)dt). Then, this is converted into digital data by an A/D converter 92, and is transmitted to the CPU 94.

On the other hand, the control part 53 transmits the position signal S1 having the light receiving level, transmitted from the position detecting sensor 16, to an A/D converter 93. The A/D converter 93 converts the position signal S1 into digital data, and transmits this to the CPU 94.

The CPU 94 compares the light receiving level with the prescribed threshold level based on the position signal S1 that has been converted into the digital data. And if the light receiving level of the position signal S1 exceeds the threshold level, the CPU 94 determines that the received light position (x1, y1) of the position signal S1 can be accurately detected by the position detecting sensor 16 being an external sensor. In this case, to execute the control of correcting an optical axis in a normal mode, the CPU 94 calculates the amount-of-manipulation in X-direction UX(t) and the amount-of-manipulation in Y-direction UY(t) expressed by the expressions (5) and (6), and transmits them to a D/A converter 95.

The D/A converter 95 converts the digital data represented by the amount-of-manipulation in X-direction UX(t) and the amount-of-manipulation in Y-direction UY(t) into analog signals to generate error voltage signals S3 and S4 for correcting an optical axis, and transmits them to a driving circuit for optical axis correcting apparatus 96. The driving circuit for optical axis correcting apparatus 96 generates drive signals SX1 and SY1 used to adjust the rotary angle of the reflecting mirror 52 based on the error voltage signals S3 and S4, and transmits them to the optical axis correcting apparatus 50.

On the contrary, if the light receiving level is lower than the threshold level, the CPU 94 determines that the received light position (x1, y1) of the position signal S1 cannot be accurately detected by the position detecting sensor 16 being an external sensor. In this case, to execute the control of correcting an optical axis in disturbance-preventing mode, the CPU 94 calculates the amount-of-correction in X-direction WX(t) and the amount-of-correction in Y-direction WY(t) expressed by the expressions (9) and (10), and transmits them to the D/A converter 95.

The D/A converter 95 converts the digital data represented by the amount-of-correction in X-direction WX(t) and the amount-of-correction in Y-direction WY(t) into analog signals to generate error voltage signals S3' and S4', and transmits them to the driving circuit for optical axis correcting apparatus 96. The driving circuit for optical axis correcting apparatus 96 generates drive signals SX1' and SY1' used to keep the rotary angle of the reflecting mirror 52 of the optical axis correcting part 51 in that position based on the error voltage signals S3' and S4', and supplies them to the optical axis correcting apparatus 50.

Figure 16:
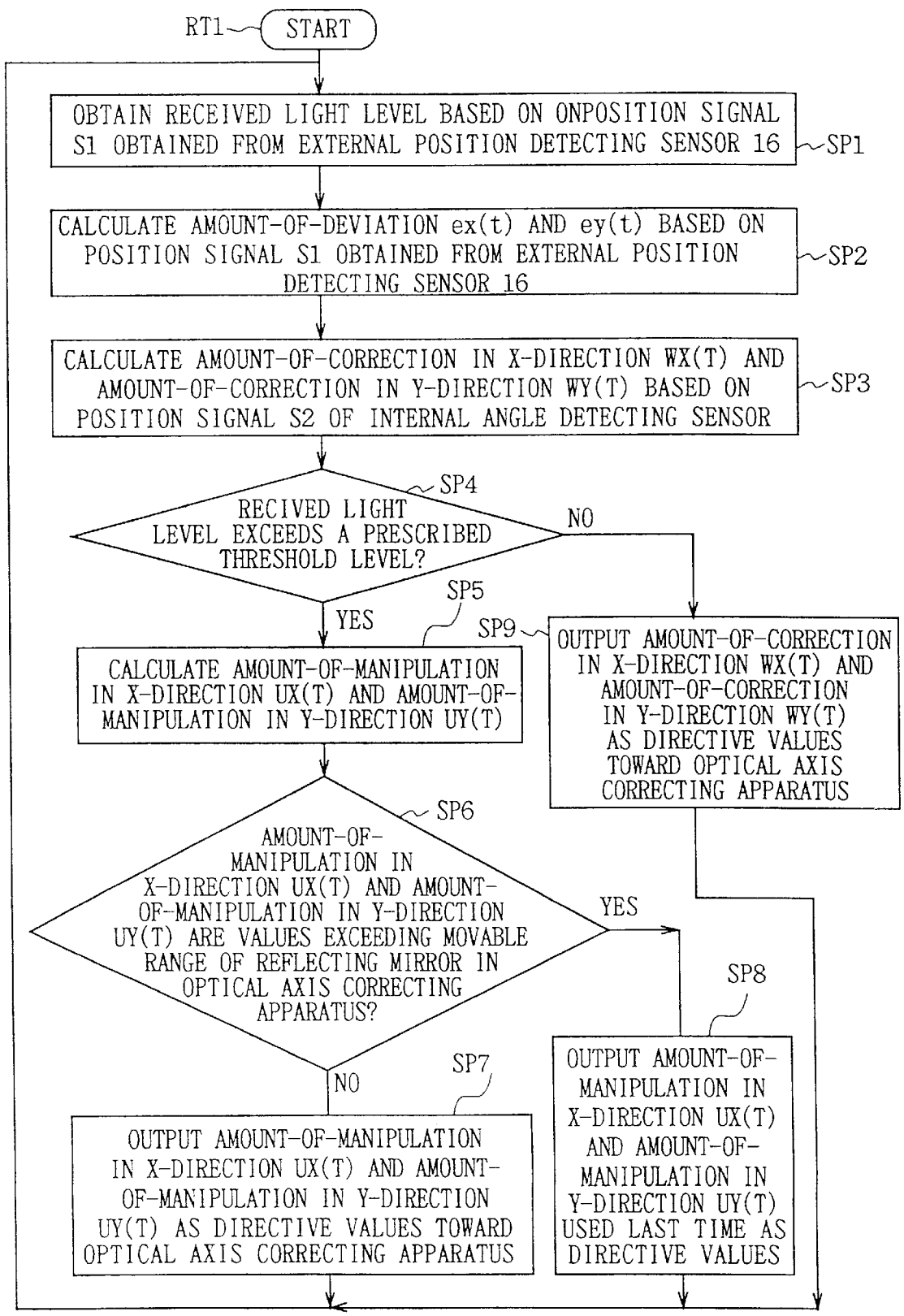
FIG. 16 is a flow chart showing the processing procedure of controlling the rotary angle of the reflecting mirror.

Hereinafter, a processing procedure for what the optical axis correcting apparatus controls the rotary angle of the reflecting mirror 52 of the optical axis correcting part 51 in a normal mode or in a disturbance-preventing mode based on the light receiving level of the laser beam received with the position detecting sensor 16 will be described with reference to the flowchart of FIG. 16. The optical axis correcting apparatus 50 enters the processing from start step RT1, and proceeds to step SP1.

In step SP1, the control part 53 obtains the received light level based on the position signal S1 obtained from the external position detecting sensor 16, and proceeds to the next step SP2. In step SP2, the control part 53 calculates the angular voltage signals ex(t) and ey(t) based on the position signal S1 obtained from the external position detecting sensor 16, and proceeds to the next step SP3.

In step SP3, the control part 53 calculates the amount-of-correction in X-direction WX(t) and the amount-of-correction in Y-direction WY(t) used to turn back the reflecting mirror 52 by the amount of its movement owing to the oscillation of the optical axis correcting part 51 itself by disturbance and to keep its position, with the expressions (9) and (10) based on the position signal S2 obtained from the angle detecting sensor for Y-axis 42 and the angle detecting sensor for X-axis 43 inside the optical axis correcting apparatus 50, and proceeds to the next step SP4.

In step SP4, the control part 53 determines whether the received light level exceeds the prescribed threshold level or not. If an affirmative result is obtained here, this means that the received light level exceeds the prescribed threshold level. In this case, the control part 53 proceeds to step SP5 to enter the control of correcting an optical axis in a normal mode.

In step SP5, the control part 53 calculates the amount-of-manipulation in X-direction UX(t) and the amount-of-manipulation in Y-direction UY(t) with the expressions (5) and (6) using the angular voltage signals ex(t) and ey(t) and the rotary angular velocity in x-direction vx(t) and the rotary angular velocity in y-direction vy(t), because the position signal S1 has been correctly detected by the position detecting sensor 16. And then, the control part 53 proceeds to the next step SP6.

In step SP6, the control part 53 determines whether or not the movable range of the reflecting mirror 52 based on the amount-of-manipulation in X-direction UX(t) and the amount-of-manipulation in Y-direction UY(t) is wider than the range of rotary angle limited so that the laser beam is incident on the light receiving surface of the position detecting sensor 16. Note that, if it is detected that the position signal S1 could not been obtained from the position detecting sensor 16, the control part 53 recognizes that the movable range of the reflecting mirror 52 is wider than the range of the rotary angle.

If a negative result is obtained here, this means that the movable range of the reflecting mirror 52 based on the amount-of-manipulation in X-direction UX(t) and the amount-of-manipulation in Y-direction UY(t) is narrower than the range of rotary angle limited. In this case, the control part 53 proceeds to step SP7.

In step SP7, the control part 53 outputs the amount-of-manipulation in X-direction UX(t) and the amount-of-manipulation in Y-direction UY(t) as directive values toward the optical axis correcting part 51, because the control part 53 recognizes that the laser beam is incident on the light receiving surface of the position detecting sensor 16, and it returns to step SP1 to repeat the aforementioned processing.

On the contrary, if an affirmative result is obtained in step SP6, this means that the movable range of the reflecting mirror 52 based on a amount-of-correction in X-direction U1(t) is wider than the range of the rotary angle. In this case, the control part 53 proceeds to step SP8.

In step SP8, the control part 53 outputs the amount-of-manipulation in X-direction UX(t) and the amount-of-manipulation in Y-direction UY(t) used last time as directive values toward the optical axis correcting part 51, to control the rotary angle of the reflecting mirror 52 within the range where the laser beam is incident on the light receiving surface of the position detecting sensor 16, because the laser beams have high possibility that it will be off the light receiving surface of the position detecting sensor 16 if the rotary angle of the reflecting mirror 52 is adjusted using the amount-of-manipulation in X-direction UX(t) and the amount-of-manipulation in Y-direction UY(t) calculated this time as they are. Then, the control part 53 returns to step SP1 to repeat the aforementioned processing.

If a negative result is obtained in step SP4, this means that the light receiving revel is lower than the prescribed threshold level. In this case, the control part 53 proceeds to step SP9 and executes the control of correcting an optical axis in a disturbance-preventing mode.

In step SP9, the control part 53 determines that the position signal S1 cannot be accurately detected by the position detecting sensor 16 due to the attenuation of the laser beam being incident on the light receiving surface of the position detecting sensor 16 owing to the external fact such as rain, fog, etc., because the received light level does not exceed the prescribed threshold level. In this case, the control part 53 outputs the amount-of-correction in X-direction WX(t) and the amount-of-correction in Y-direction WY(t) as directive values toward the optical axis correcting apparatus 50, and returns to step SP1 to repeat the aforementioned processing.

(4) Operation and Effects

According to the structure, the optical axis correcting apparatus 50 becomes a normal mode when the light receiving surface of the position detecting sensor 16 is irradiated with a laser beam having a level equal to or higher than the prescribed level. In the normal mode, the rotary angle of the reflecting mirror 52 of the optical axis correcting part 51 is adjusted under the control of the control part 53 based on the amount-of-manipulation in X-direction UX(t) and the amount-of-manipulation in Y-direction UY(t) to execute the optical axis correction. At the same time, the amount of rotation owing to the oscillation component is corrected based on the rotary angular velocity in x-direction vx(t) and the rotary angular velocity in y-direction vy(t), so that the rotary angle of the reflecting mirror 52 can be adjusted further accurately and stably.

By the way, if the light receiving surface of the position detecting sensor 16 is suddenly stopped being irradiated with the laser beam from the optical space transmission system of the communicating party, owing to obstructions or the like in the normal mode, the position signal S1 cannot be obtained from the position detecting sensor 16 instantly.

Even such situation, the optical axis correcting apparatus 50 supplies the remaining minus rotary angular velocity in x-direction vx(t) and the remaining minus rotary angular velocity in y-direction vy(t) out of the amount-of-manipulation in X-direction UX(t) and the amount-of-manipulation in Y-direction UY(t), to the optical axis correcting part 51 under the control of the control part 53, so that the reflecting mirror 52 can be restored to the position just before the laser beams falls into being off the light receiving surface of the position detecting sensor 16 and can be kept in that position.

Thereby, the optical axis correcting apparatus 50 can accurately restart to correct an optical axis based on the amount-of-manipulation in X-direction UX(t) and the amount-of-manipulation in Y-direction UY(t) as soon as the obstruction is removed and a laser beam is converged on the light receiving surface of the position detecting sensor 16, and can stably execute the optical axis correction by restraining the influences of oscillation by disturbance.

Furthermore, since the optical axis correcting apparatus 50 calculates the rotary angular velocity in x-direction vx(t) and the rotary angular velocity in y-direction vy(t) by differentiating the interior angular voltage signals eax(t) and eay(t) as shown in the expressions (3) and (4) with the differential circuit 79, it is no need to individually provide an angular velocity detecting sensor that detects the rotary speed (i.e., angular velocity component) of the reflecting mirror 52 and feeds back the detected result, as conventional one. Thus, the apparatus itself can be miniaturized and simplified.

Moreover, when the laser beam may be off the light receiving surface of the position detecting sensor 16 due to the deviation of optical axis at any moment or when the laser beam to be incident on the light receiving surface of the position detecting sensor 16 is attenuated due to the external fact such as rain, fog, etc., and the light receiving level became lower than the prescribed level, the optical axis correcting apparatus 50 becomes the disturbance-preventing mode and switches the switching circuits 71 to 74 to the changeover terminals 71B to 74B to perform the control, to keep the reflecting mirror 52 in the position based on the amount-of-correction in X-direction WX(t) and the amount-of-correction in Y-direction WY(t) expressed by the expressions (9) and (10) so as not to rotate it owing to oscillation.

Thereby, when the light receiving surface of the position detecting sensor 16 starts to be irradiated with the laser beams again or when the received light level of the laser beam being incident on the light receiving surface of the position detecting sensor 16 becomes higher than the prescribed threshold level, the optical axis correcting apparatus 50 becomes the normal mode again and switches the switching circuits 71 to 74 to the changeover terminals 71A to 74A. Thus, the optical axis can accurately restarted to be corrected based on the amount-of-manipulation in X-direction UX(t) and the amount-of-manipulation in Y-direction UY(t) at the position where the reflecting mirror 52 has been kept.

Furthermore, since the optical axis correcting apparatus 50 obtains the range of the rotary angle for the reflecting mirror 52 with the control part 53 to prevent the laser beam from being off the light receiving surface of the position detecting sensor 16 owing to big deviation of optical axis, and limits the rotary angle for the reflecting mirror 52 by providing the stopper 41 to rotate the reflecting mirror 52 only within the range of that rotary angle. Thereby, the control of control an optical axis can be prevented at a position where the laser beam may be off the light receiving surface of the position detecting sensor 16 at any moment, and thus, an optical axis can be corrected accurately and stably.

In this manner, the optical axis correcting apparatus 50 electrically corrects optical axes with a simple configuration under PID (Proportional, Integral, and Differential) control without using a mechanical transmission mechanism. Thereby, it is possible to rapidly response to the command to correct an optical axis and also to prevent dispersion in accuracy owing to deterioration in the transmission mechanism part or the like. Thus, an optical axis can be corrected further accurately.

According to the structure, if the received light level of the laser beam obtained by the position detecting sensor 16 exceeds the prescribed threshold level, the optical axis correcting apparatus 50 adjusts the rotary angle of the reflecting mirror 52 based on the amount-of-manipulation in X-direction UX(t) and the amount-of-manipulation in Y-direction UY(t) calculated using the position signal S1 in a normal mode and further, performs the control to restore the reflecting mirror 52 to the original position according to the minus rotary angular velocity in x-direction vx(t) and the rotary angular velocity in y-direction vy(t) when an oscillation component leads to movement of the reflecting mirror 52 and then to keep it in that position. Thus, influence by oscillation owing to disturbance or the like is removed, and an optical axis can be corrected stably and accurately.

Figure 17:
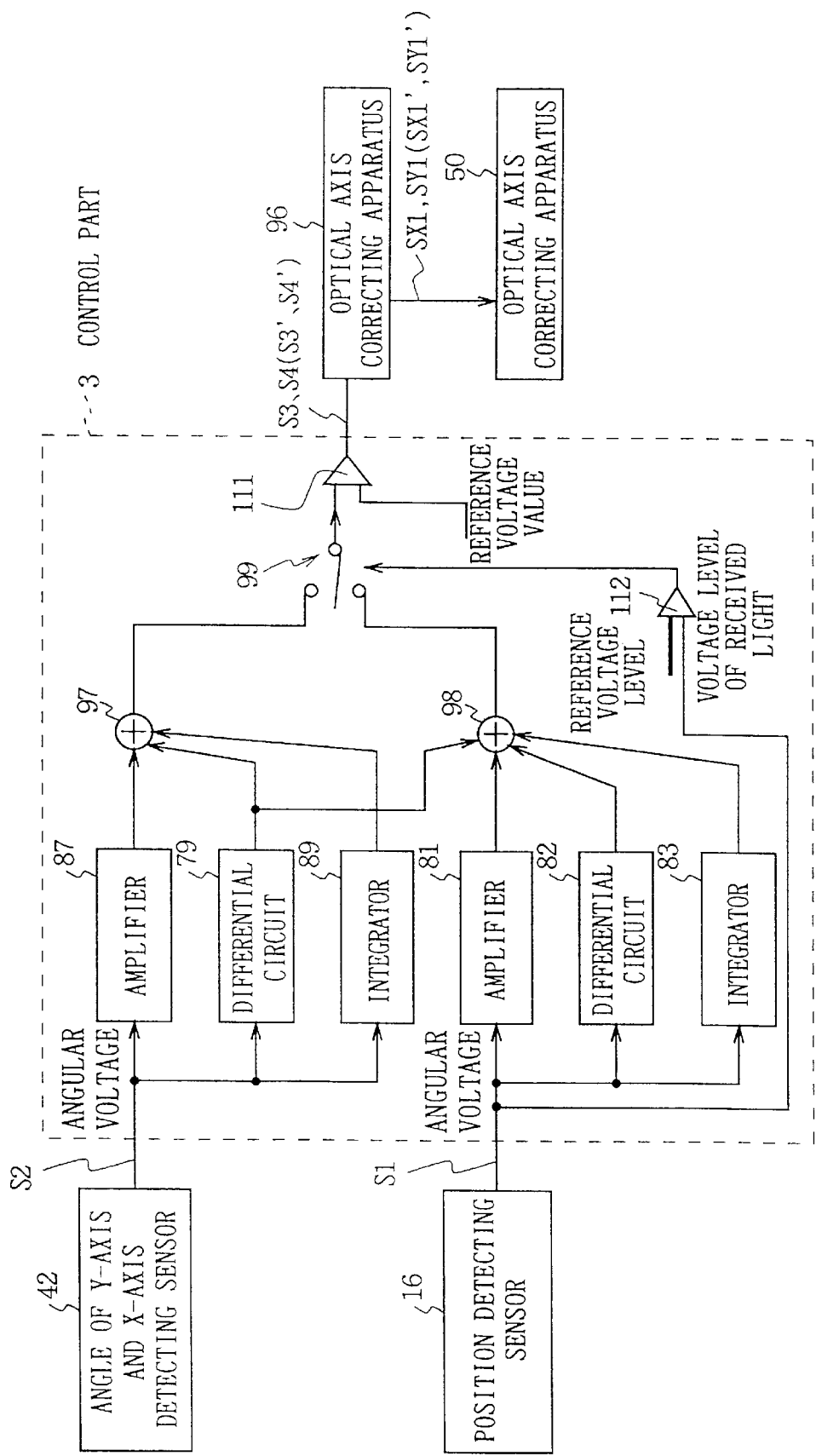
FIG. 17 is a block diagram showing the concrete circuitry of a control part in another embodiment.

Moreover, if the light receiving level of the laser beam obtained by the position detecting sensor 16 is lower than the prescribed threshold level, the optical axis correcting apparatus 50 determines that the rotary angle of the reflecting mirror 52 cannot accurately be adjusted based on the amount-of-manipulation in X-direction UX(t) and the amount-of-manipulation in Y-direction UY(t) calculated using the position signal S1. In this case, the optical axis correcting apparatus 50 controls to restore the rotary angle of the reflecting mirror 52 to the position just before the light receiving level of the laser beam is lower than the prescribed threshold level and to keep it in that position in a disturbance-preventing mode. Thereby, the optical axis correcting apparatus 50 becomes the normal mode again and immediately restarts to correct an optical axis at the position where the reflecting mirror 52 has been kept, when the light receiving level of the laser beam exceeds the prescribed threshold level. (5) Other Embodiments In the aforementioned embodiment, concretely the control part 53 performs processing digitally as shown in FIG. 15. However, the present invention is not only limited to this. For example, as shown in FIG. 17 in which the same reference numerals are applied to the corresponding parts of FIG. 15, the control part 53 adds the outputs of the amplifier 81 through the integrator 83 to the minus output of the differential circuit 79 with the computing element 98 to generate the amount-of-manipulation in X-direction UX(t) and the amount-of-manipulation in Y-direction UY(t) in the expressions (5) and (6). Then, the amount-of-manipulation in X-direction UX(t) and the amount-of-manipulation in Y-direction UY(t) are transmitted to a comparator 111 through a switching circuit 99 switched based on the result of comparing the received light level to the reference voltage level in the position detecting sensor 16 by a comparator 112. Thereafter, the amount-of-manipulation in X-direction UX(t) and the amount-of-manipulation in Y-direction UY(t) are compared with the reference voltage value by the comparator 111. If they are higher than the reference voltage value, the amount-of-manipulation in X-direction UX(t) and the amount-of-manipulation in Y-direction UY(t) are transmitted to the driving circuit for optical axis correcting apparatus 96 as an error voltage signal S3 for correcting an optical axis.

Further, the control part 53 can add the minus outputs of the amplifier 87 and integrator 89 to the minus output of the differential circuit 79 with a computing element 97, to generate the amount-of-correction in X-direction WX(t) and the amount-of-correction in Y-direction WY(t) in the expressions (9) and (10), can transmit them to the comparator 111 through the switching circuit 99 switched based on the result of comparing the received light level to the reference voltage level in the position detecting sensor 16 by the comparator 112, can compare the amount-of-correction in X-direction WX(t) and the amount-of-correction in Y-direction WY(t) with the reference voltage value with the comparator 111. If they are higher than the reference voltage value, they can be transmitted to the driving circuit for optical axis correcting apparatus 96 as error voltage signals S3' and S4' used to keep the reflecting mirror 52 in that position. In this case, the control part 53 can control the rotary angle of the reflecting mirror 52 in analog.

In the aforementioned embodiment, on the other hand, if the light receiving level of the laser beam is lower than the prescribed threshold level, the control to keep the reflecting mirror 52 in that position based on the amount-of-correction in X-direction WX(t) and the amount-of-correction in Y-direction WY(t) calculated by the detected result of the angle detecting sensor for Y-axis 42 and the angle detecting sensor for X-axis 43 in a disturbance-preventing mode is performed. However, the present invention is not only limited to this but also the reflecting mirror 52 can be kept in that position based on the amount-of-correction in X-direction WX(t) and the amount-of-correction in Y-direction WY(t) in the disturbance-preventing mode, even if the received light level of the laser beam is higher than the prescribed threshold level as the case where a strong light beam such as sunlight is incident.

In the aforementioned embodiment, the optical axis correcting apparatus according to the present invention is composed of the optical axis correcting part 51 and the control part 53 as optical axis changing means, the position detecting sensor 16 as direction-of-optical-axis detecting means, the control part 53 as optical axis adjusting means, and the optical axis correcting part 51 and the control part 53 as correcting means. However, the present invention is not only limited to this but also it can be composed of optical axis changing means, direction of optical axis detecting means, optical axis adjusting means, and correcting means that have other various configurations.

According to the present invention as described above, the angle of a reflecting mirror is adjusted based on the direction of the optical axis of the detected light beam. In addition, if an oscillation component from the outside leads to rotation of the reflecting mirror, the change of its angle is detected and the angle of the reflecting mirror is corrected based on the detected result. Thereby, useless movement of the reflecting mirror by the oscillation component can be corrected, and the optical axis can be corrected accurately. Thus, an optical axis correcting apparatus capable of correcting optical axes further accurately with a simple configuration can be realized.

Furthermore, according to the present invention as described above, the angle of the reflecting mirror is adjusted based on the direction of the optical axis of the detected light beam. In addition, if an oscillation component from the outside leads to rotation of the reflecting mirror, the change of its angle is detected and the angle of the reflecting mirror is corrected based on the detected result. Thereby, useless movement of the reflecting mirror by the oscillation component can be corrected, and the optical axis correction can be executed accurately. Thus, a method of correcting an optical axis capable of correcting optical axes further accurately with a simple configuration can be realized.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An optical axis correcting apparatus for correcting the optical axis of a light beam from a communicating party in an optical space transmission system that transmits and receives the light beam to/from said communicating party, comprising:

optical axis changing means for changing the angle of a reflecting mirror placed in an optical path of the light beam, to change the optical axis of the light beam to be reflected by said reflecting mirror;

optical axis direction detecting means for detecting the direction of the optical axis of the light beam that is changed by said optical axis changing means;

optical axis adjusting means for adjusting the angle of said reflecting mirror based on the direction of the optical axis of the light beam detected by said optical axis direction detecting means with said optical axis changing means, to adjust the direction of the optical axis of the light beam toward said communicating party; and correction means for detecting a rotary angular velocity of the reflecting mirror owing to an oscillation applied to said reflecting mirror, and for correcting the angle of said reflecting mirror based on the detected rotary angular velocity.

2. The optical axis correcting apparatus according to claim 1, wherein when said optical axis direction detecting means can not detect the direction of the optical axis, said correction means keeps the angle of said reflecting mirror just before the detection of the direction of the optical axis comes to be impossible.

3. The optical axis correcting apparatus according to claim 1, wherein said optical axis changing means has a stopper to adjust the angle of said reflecting mirror only within a range of angles that enables said optical axis direction detecting means to detect the direction of the optical axis of the light beam.

4. A method of correcting the optical axis of a light beam from a communicating party in an optical space transmission system that transmits and receives the light beam to/from said communicating party, the method comprising the steps of:

detecting the direction of the optical axis of the light beam that is changed by changing an angle of a reflecting mirror placed in an optical path of the light beam;

adjusting the direction of the optical axis of the light beam by adjusting the angle of said reflecting mirror based on the detected direction of the optical axis of the light beam; and detecting a rotary angular velocity of said reflecting mirror owing to an oscillation applied to said reflecting mirror and correcting the angle of said reflecting mirror based on the detected rotary angular velocity.

5. The method of correcting an optical axis according to claim 4, further comprising the step of keeping the angle of said reflecting mirror just before detection of the direction of the optical axis comes to be impossible, when the direction of the optical axis can not be detected.

6. The method of correcting an optical axis according to claim 4, further comprising the step of adjusting the angle of said reflecting mirror only within a range of angles in which the direction of the optical axis of the light beam can be detected.

* * * * *